(12) United States Patent
Theobald

(10) Patent No.: US 10,556,334 B1
(45) Date of Patent: Feb. 11, 2020

(54) SYSTEM AND METHOD OF ASYNCHRONOUS ROBOTIC RETRIEVAL AND DELIVERY OF ITEMS BETWEEN TWO SITES

(71) Applicant: Vecna Technologies, Inc., Cambridge, MA (US)

(72) Inventor: Daniel Theobald, Somerville, MA (US)

(73) Assignee: VECNA ROBOTICS, INC., Waltham, MA (US)

( * ) Notice: Subject to any disclaimer, the term of this patent is extended or adjusted under 35 U.S.C. 154(b) by 0 days.

(21) Appl. No.: 16/035,236

(22) Filed: Jul. 13, 2018

Related U.S. Application Data

(63) Continuation-in-part of application No. 16/035,201, filed on Jul. 13, 2018.

(51) Int. Cl.
| | |
|---|---|
| *B25J 9/00* | (2006.01) |
| *B65G 1/04* | (2006.01) |
| *B25J 9/16* | (2006.01) |
| *B65G 1/02* | (2006.01) |
| *B25J 5/00* | (2006.01) |
| *G05D 1/02* | (2020.01) |
| *G06Q 50/00* | (2012.01) |
| *G05D 1/00* | (2006.01) |
| *G06N 20/00* | (2019.01) |
| *B60L 53/80* | (2019.01) |
| *B25J 15/00* | (2006.01) |
| *B25J 13/06* | (2006.01) |

(52) U.S. Cl.
CPC .................. *B25J 9/00* (2013.01); *B25J 5/007* (2013.01); *B25J 9/1679* (2013.01); *B25J 13/06* (2013.01); *B25J 15/0019* (2013.01); *B60L 53/80* (2019.02); *B65G 1/026* (2013.01); *B65G 1/0492* (2013.01); *G05D 1/0088* (2013.01); *G05D 1/0223* (2013.01); *G06N 20/00* (2019.01); *G06Q 50/01* (2013.01); *G05D 2201/0206* (2013.01); *Y10S 901/01* (2013.01)

(58) Field of Classification Search
CPC ....... B66F 9/063; B65G 1/0492; B65G 1/065; B25J 9/00
See application file for complete search history.

(56) References Cited

U.S. PATENT DOCUMENTS

| | | | |
|---|---|---|---|
| 5,510,984 A | 4/1996 | Markin | |
| 9,411,337 B1 * | 8/2016 | Theobald | ................... B25J 9/00 |
| 9,463,927 B1 * | 10/2016 | Theobald | ............. B65G 1/1373 |
| 9,466,046 B1 | 10/2016 | Theobald | |

(Continued)

*Primary Examiner* — Thomas Randazzo

(57) ABSTRACT

Asynchronous item delivery utilizes a system including a first depot and a first mobile robot at a first site and a second depot and a second mobile robot at a second site. A centralized control system manages asynchronous delivery of items through the first depot and the second depot such that the first mobile robot can retrieve an item from the first depot and deliver the item to a transportation systems for transition to the second site, such that the second depot at the second site can, in an asynchronous fashion, receive the item and deliver the item to the second mobile robot for transportation to the ultimate destination at the second site. Two or more sites can be coordinated by the centralized control system for management of movement of items through a supply chain using asynchronous item delivery and movement through each respective site to an ultimate destination.

21 Claims, 18 Drawing Sheets

(56) References Cited

U.S. PATENT DOCUMENTS

| | | | |
|---|---|---|---|
| 9,489,490 B1* | 11/2016 | Theobald | G06F 19/3462 |
| 9,701,012 B1 | 7/2017 | Theobald | |
| 9,720,414 B1* | 8/2017 | Theobald | G06Q 50/14 |
| 9,919,420 B1* | 3/2018 | Theobald | B25J 5/00 |
| 10,168,699 B1* | 1/2019 | Theobald | G05D 1/0088 |
| 2004/0019406 A1* | 1/2004 | Wang | B25J 5/007 |
| | | | 700/231 |
| 2007/0129849 A1* | 6/2007 | Zini | G05B 19/41895 |
| | | | 700/258 |
| 2010/0234995 A1 | 9/2010 | Zini et al. | |
| 2011/0160948 A1* | 6/2011 | Bailey | G05D 1/0259 |
| | | | 701/23 |
| 2014/0333190 A1 | 11/2014 | Kim | |
| 2016/0167227 A1* | 6/2016 | Wellman | B25J 9/1612 |
| | | | 700/259 |
| 2017/0038776 A1 | 2/2017 | Gariepy et al. | |
| 2017/0121114 A1* | 5/2017 | Einav | B65D 21/0235 |
| 2017/0330269 A1 | 11/2017 | Kanellos et al. | |
| 2018/0265297 A1* | 9/2018 | Nakano | B65G 1/1373 |

\* cited by examiner

SYSTEM AND METHOD OF ASYNCHRONOUS ROBOTIC RETRIEVAL AND DELIVERY OF ITEMS BETWEEN TWO SITES

RELATED APPLICATION

This Continuation-in-part application claims priority to U.S. patent application Ser. No. 16/035,201, filed Jul. 13, 2018, which is herein incorporated by reference in its entirety.

The present technology pertains to robotics and more specifically to a system and method of providing asynchronous robotic retrieval and delivery of items utilizing a depot and a mobile robot at a first site and a depo and a mobile robot at a second site.

BACKGROUND

An estimated 30%-46% of hospital budgets are spent on logistics activities such as moving medications, supplies, devices, charts, and surgical instruments through the supply chain to where they are needed at the point of care. At the same time nurses are only able to spend approximately 31% of their day on direct patient care due to non-value-added logistics and administrative responsibilities. In addition, the downstream cost of ineffective logistics is enormous as patient safety issues often result when the right medication isn't available or when staff are unavailable or continually interrupted by poor processes.

Similar issues can exist in any organization that deploys a supply chain to move items from one location to another. The human attention that needs to be paid to the supply chain processes will always draw attention away from other potentially more valuable activities.

What is needed is an improved system to enable staff at hospitals or staff at other entities to spend more time on more valuable human-related activities such as direct patient care.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
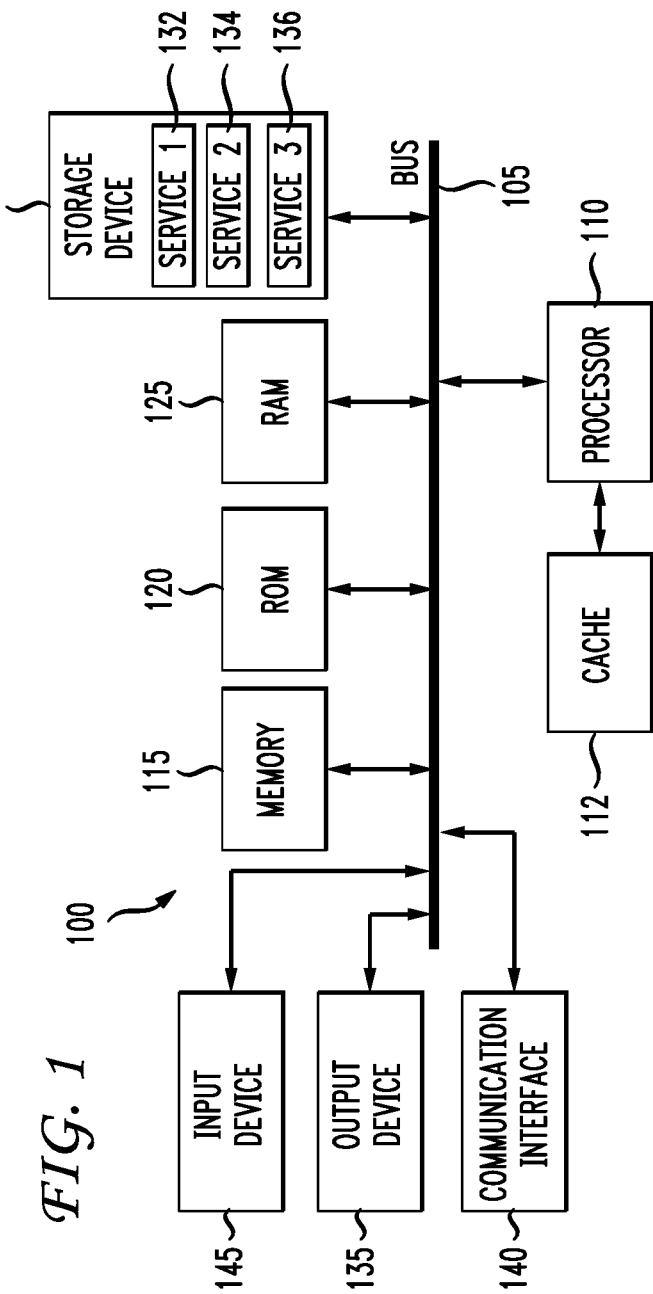
FIG. 1 illustrates an example computing device for use an any component disclosed herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

While the concepts disclosed herein can apply to any supply chain management, the primary entity which will be discussed is a hospital in which medicine, medical instruments, and other items are constantly being delivered. However, this disclosure applies to any organization that requires items to be delivered from an originating location within the organization to a destination.

Currently, when a medication delivery robot arrives at a destination, it will page a nurse to come and unload it, interrupting the nurse's patient care and preventing the robot from moving to its next delivery until it has been unloaded. This disclosure presents a novel, modular, platform-independent drawer swapping unit that overcomes these limitations. Instead of staff waiting for the robot, staff can pick up and drop off materials any time at a conveniently located depot or repository. Using the depot allows staff to devote more time to patient care, while minimal direct contact with the delivery robots will reduce the frustration commonly experienced with current hospital robot systems. Medication errors, especially omitted, missed or wrong-time doses, will be reduced through improved availability of medication in a unit. Freed from the burden of interruptions common to direct interaction with current delivery robots, pharmacists and nurses will experience less stress and make fewer mistakes.

The disclosed technology addresses the need in the art for an item delivery system that can be applicable in environments such as hospitals which enables a more efficient access and delivery of items used in the hospital such that staff can spend more time with patients.

In another example, the asynchronous use of a depot containing a rack of drawers and the mobile robot that swaps drawers to and from the depot can also be established at multiple sites and a centralized control system can manage the movement of items through a first depot at a first site, through transportation system, to a second depot at the second site and ultimately, through the use of a mobile robot, to a final destination. The various hardware components, robots, control systems, depots, and transportation systems can each be separately and independently claimed utilizing the concepts disclosed herein. In other words, one embodiment can include a centralized control system communicating data to and receiving data from the various components disclosed herein. In another aspect, claims could be directed to the transportation system that receives instructions and performs transportation operations between the first site and a second site. In another example, even in a multi-site context, claims could be directed to an individual depot, an individual mobile robot, or any individual component operating in the context of a larger ecosystem in which items are transported from one site to another using the asynchronous principles disclosed herein.

In the multiple site scenario, a method includes receiving, via the control system, at a first depot at a first site and via a first depot user interface, a specification by a user of a destination depot at a second site and an item to yield item delivery data, selecting, based on item delivery data and by the control system, a drawer from a first rack module in the first depot that houses drawers, receiving the item from the user via the first depot user interface, transferring the item to the drawer within the rack module that houses drawers, communicating, from the first depot over the control system and to a first mobile robot, a message to pick up the item, transferring the item from the drawer to the first mobile robot using a first depot drawer-swapping module and a first mobile robot drawer-swapping module and delivering, by the first mobile robot, the item to a transportation system.

The first mobile robot might deliver the item, which can be contained in a tote, container, drawer, or any other mechanism, into a particular position within the transportation system. For example, a truck may have a trailer with the center aisle in which a mobile robot travels up a ramp and delivers the item at a particular position within a rack of shelves configured within the trailer. The truck would deliver the trailer from the first site to the second site. The control system communicates the position of each item in the rack system on the trailer of the truck such that the second mobile robot at the second site can retrieve each respective container. At the second site, a second depot is configured such that asynchronous delivery of various items to various positions within a rack system of the second depot can occur such that another mobile robot could retrieve items from the second depot for delivery to an ultimate destination.

In this regard, the method includes receiving, via the control system, at the second depot at a second site and via a second depot user interface (optionally), a specification by a user or the control system, a final destination at a second site and the item to yield second item delivery data, selecting, based on item delivery data and by the control system, a drawer from a second rack module in the second depot that houses drawers, receiving the item from the a mobile robot that retrieves the item from the transportation system and transfers the item to the drawer within the second rack module that houses drawers in the second depot. The second depot where the control system can communicate to a third mobile robot at the second site, a message to pick up the item, transfer the item from the drawer to the third mobile robot using a second depot drawer-swapping module and deliver, by the third mobile robot, the item to the final destination.

The method can also include any one or more of the steps disclosed herein and in any order. Control mechanisms may be centralized at a centralized control system, or may be distributed amongst the various components disclosed herein.

Overview

The present disclosure addresses the deficiencies in robotic retrieval and delivery systems which can be applicable to environments such as hospitals, warehouses, and so forth. In one example, the concepts can include an asynchronous item delivery system including a depot and a mobile robot working together to provide asynchronous receipt and delivery of items. The depot can include a depot user interface, a rack module that houses drawers, a depot drawer-swapping module, a depot battery-swapping module and a depot control system that connects to and controls the depot user interface and the rack module, the depot battery-swapping module and the depot drawer-swapping module. This disclosure will provide a description of the use of the depot and the mobile robot as well as an example system in which a first site implements a first depot and a first mobile robot and the second site implements a second depot and the second mobile robot. A centralized control system and a transportation system are utilized to coordinate movement of items through the first site and the second site in which each site incorporates an asynchronous item delivery system is disclosed herein.

A mobile robot can include a mobile robot drawer-swapping module, a mobile robot battery-swapping module and a mobile control system that connects and controls the mobile robot drawer-swapping module and the mobile robot battery-swapping module. The depot and the mobile robot operate in a coordinated manner to asynchronously deliver an item from the originating depot that receives the item from a staff member to a destination depot by performing operations including receiving, at the depot and via the depot user interface, a specification by a user of the destination depot and the item to yield item delivery data, selecting, based on item delivery data and the by the depot control system, a drawer from the rack module that houses drawers, receiving the item from the user via the depot user interface, communicating the item to the drawer from the rack module that houses drawers, communicating, from the depot and to the mobile robot, a message to pick up the item, optionally swapping a first battery on the mobile robot with a second batter charged by the depot via the depot battery-swapping module and the mobile robot battery-swapping module, transferring the item from the drawer in the depot to the mobile robot using the depot drawer-swapping module and the mobile robot drawer-swapping module and delivering, by the mobile robot, the item to the destination depot.

The depot can receive and provide a mechanism for scanning the item before receiving the item in the drawer. The system can also compile a manifest for each drawer in the rack module that houses the drawers. The manifest can include one or more of an identification of the drawer, items in the drawer, the destination, and instructions for delivery of the item. After receiving the item in the drawer, the depot can route the drawer to a chosen position in the rack module in preparation for retrieval by the mobile robot. Delivering, by the mobile robot, the item to the destination depot can be performed using machine learning to schedule one of a route, a timing and a pace of delivering the item to the destination depot. The system can include a single mobile robot or multiple mobile robots operating to retrieve and deliver items.

The disclosure also includes system embodiments from the standpoint of the depot, only as well as the mobile robot only. In another aspect, the depot and the mobile robot communicate with each other and with a centralized server to coordinate movement, item pickup, mobile robot routing and scheduling through the environment and so forth. The system can perform any one or more of the steps disclosed herein and in any order.

A method embodiment includes one or more of the following steps, in any order: (1) receiving, at a depot and via a depot user interface, a specification by a user of a destination depot and an item to yield item delivery data, (2) selecting, based on item delivery data and by a depot control system, a drawer from a rack module in the depot that houses drawers, (3) receiving the item from the user via the depot user interface, (4) communicating the item to the drawer within the rack module that houses drawers, (5) communicating, from the depot and to a mobile robot, a message to pick up the item, (6) swapping a first battery on the mobile robot with a second batter charged by the depot via a depot battery-swapping module and a mobile robot battery-swapping module, (7) transferring the item from the drawer in the depot to the mobile robot using a depot drawer-swapping module and a mobile robot drawer-swapping module and (8) delivering, by the mobile robot, the item to the destination depot.

DETAILED DESCRIPTION

The disclosure now turns to FIG. 1, which illustrates an example computing system including various hardware components, which can be used to implement the system, depot, robot, server, communication device, or any other computing device disclosed herein.

In this example, FIG. 1 illustrates a computing system architecture 100 including components in electrical communication with each other using a connection 105, such as a bus. System 100 includes a processing unit (CPU or processor) 110 and a system connection 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware or software service, such as service 1 132, service 2 134, and service 3 136 stored in storage device 130, configured to control the processor 110 as well as a special-purpose processor where software instructions are incorporated into the actual processor design. The processor 110 may be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include services 132, 134, 136 for controlling the processor 110. Other hardware or software modules are contemplated. The storage device 130 can be connected to the system connection 105. In one aspect, a hardware module that performs a particular function can include the software component stored in a computer-readable medium in connection with the necessary hardware components, such as the processor 110, connection 105, output device 135, and so forth, to carry out the function.

For clarity of explanation, in some instances the present technology may be presented as including individual functional blocks including functional blocks comprising devices, device components, steps or routines in a method embodied in software, or combinations of hardware and software.

The systems and methods disclosed herein address the problem of wasted time by individuals within an organization or workplace environment in which items need to be deposited at a location and then later delivered to another location. The system disclosed herein can apply to any environment in which individuals deposit an item at a location and wherein the item then needs to be delivered to a second location. One example of such an environment is the hospital in which medications and supplies are routinely being distributed throughout the environment. While the examples provided herein will primarily relate to a hospital environment, it is specifically noted that the principles can apply to any type of environment where items need to be delivered.

Disclosed is a new approach to robotic delivery of medications and supplies within a hospital environment. The system addresses limitations of both current human and robotic approaches to delivery and is able to securely and autonomously pick up and drop off supplies in a new way. Instead of altering human workflows to accommodate a robot, the robot instead accommodates humans through its specialized delivery systems. This approach transparently integrates the robots into daily workflow, reducing stress on staff and minimizing the interruptions that often cause errors. As a result, staff spend less time hunting down supplies and medications and devote more attention to the care of patients. Infrastructure and associated costs are reduced, flexibility is increased, and robots can serve a much greater number and variety of delivery locations.

The system has been developed using simulation and modeling tools, rapid prototyping and 3D printing, automated mechanical testing, user-centric design, and A/B testing.

Figure 2:
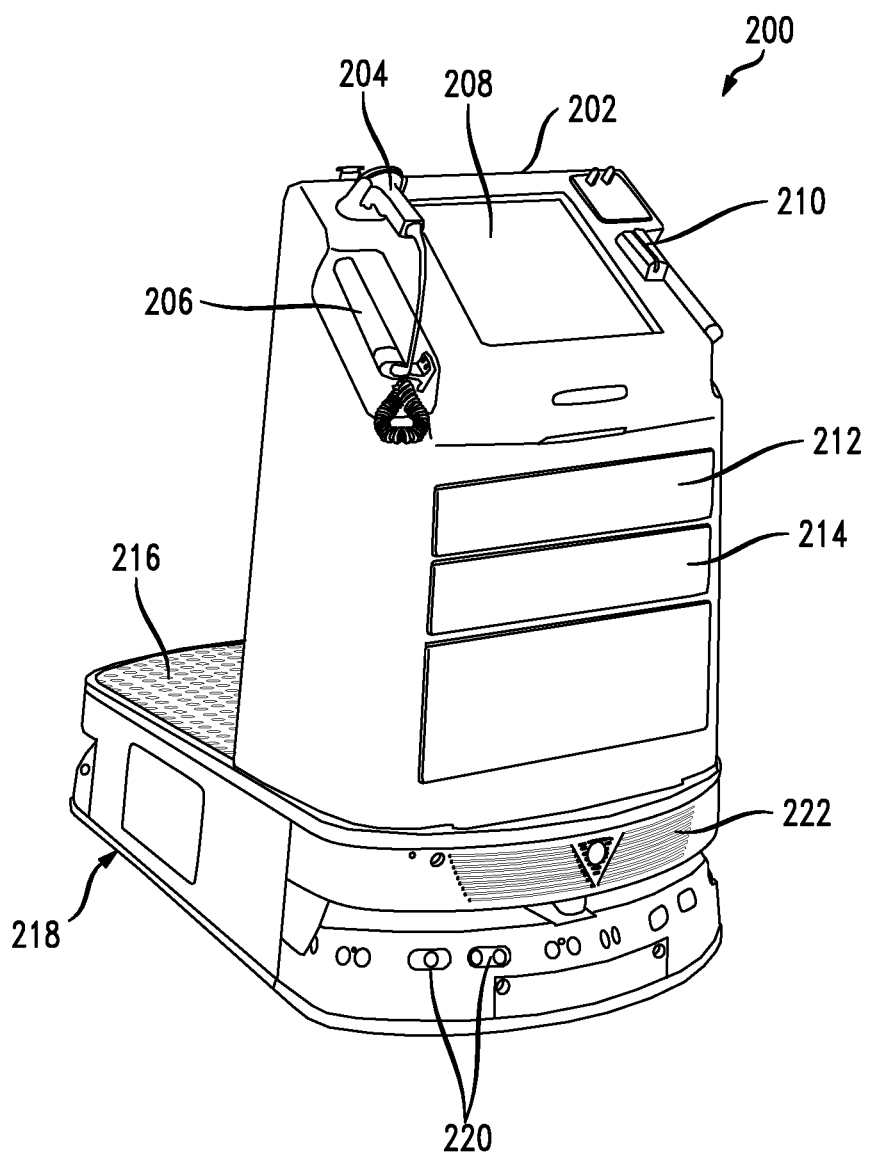
FIG. 2 illustrates an example mobile robot which is part of the asynchronous delivery system disclosed herein.

Logistics robots can provide tremendous return on investment for hospitals by increasing efficiency and maximizing the time staff focus on patient care. However, a barrier to fully unlocking that return on investment is "desynchronizing" payload transport by removing the need for staff to be interrupted throughout the day to load and unload the robot. For example, robots exist such as the QC Bot 200, shown in FIG. 2, provided by Vecna Technologies, which is a mobile robot that is deployable in a hospital and can deliver medicine and/or food to patients. Basic components of the robot 200 include a casing 202 that houses the various electrical and mechanical components. A scanner 204 which can be used to scan barcodes, QR codes, or any other scannable data. Robot 200 can optionally have handles 206 for better handling and/or manual movement of robot 200. The system could also utilize a 3D vision system to recognize boxes. Weights can also be provided or evaluated to determine or identify/confirm an item. Furthermore, the system can also utilize display 208 including a multimodal interface or touch sensitive interface. This can enable staff or patients to interact with the device 200. A card reader 210 is also shown for an indication or payment purposes. Drawers 212, 214 can be provided which can house medicine, supplies or other items. A loading deck 216 can be provided which can receive boxes, a person, or other material for movement from a first location to the second location.

The robot 200 can also include rollers or wheels 218, which can be controlled by a motor and a controller mechanism. Sensors 220 can be positioned around the robot 200 for sensing objects which can impede the movement of the robot 200 and enable navigation through an environment. A speaker 222 can be provided for any necessary audio. The present disclosure expands upon the use of a robot such as a shown in FIG. 2, to provide additional functionality. Currently, in the hospital environment, a nurse would manually load, for example, medicine into a tray 212 of the robot 200, interface with the user interface 208 or scanner 204 to provide necessary data, at which time the robot 200 would deliver the items.

The traditional approach described above can be described as "synchronous" in which the individuals interaction with the robot 200 is essentially synchronous with the delivery of the item received by the robot. As noted herein, the requirement of individuals to load and unload such robots has the resulting impact of interrupting staff and drawing their attention away from patient care. This can lead to medical errors as the number of interruptions from direct patient care can increase, which may cost the average 700-bed hospital around $2.8 billion a year. The innovation disclosed herein focuses on the new ability of robots to be able to drop off and pick up items on their own. If the robots were able to act more like a mail carrier and securely drop off and pick up packages without requiring the sender or recipient to be present, it would remove a major barrier to adoption.

Figure 3:
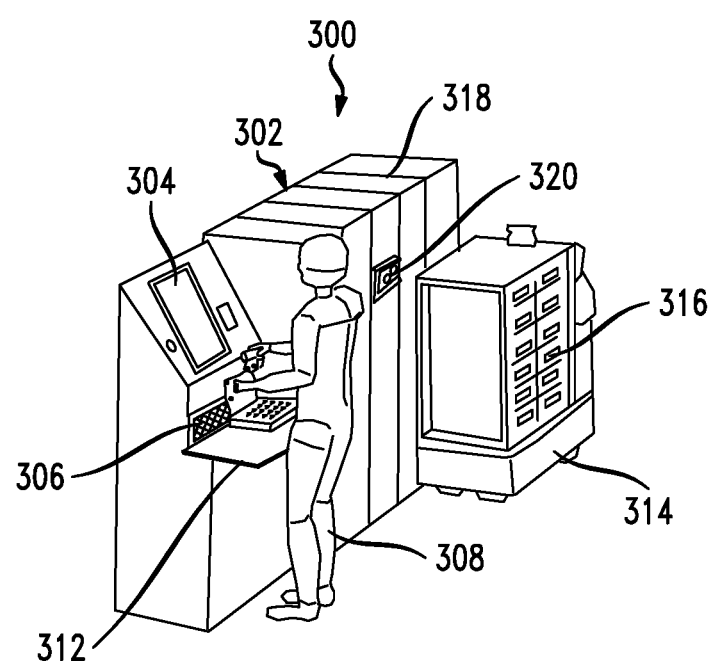
FIG. 3 illustrates a depot and a mobile robot for providing the asynchronous delivery system disclosed herein.

The innovative concept disclosed herein is for "asynchronous" pickup and dropoff of packages by mobile robots to solve this challenging research issue. In this concept, medication, devices, specimens, surgical instruments, records, and other objects will be loaded into secure boxes, and deposited into an automated repository. This general system 300 is disclosed in FIG. 3. The system 300, in one aspect, includes two components. The first is a depot 302. The depot or repository 302 is the part of the overall system 300 that the user 308 interacts with. Through a user interface 304, having input components 312 such as a keyboard, mouse, multimodal input components, etc., the user deposits an item into a drawer 306 which can be submitted into a receptacle or drawer 316. For example, a nurse 308 my deposit aspirin in the repository 302 to be delivered to room A55. The repository 302 includes the ability to receive the drawer 306 and position or move the drawer 306 into a particular location and a bank or rack of drawers 318 that are part of the repository 302. The repository 302 can thus include a group of drawers or boxes, with each box 320 containing an item to be delivered to a particular location. One benefit of this approach is that the user 308 does not need to interact with the mobile robot 314 but only has a single interactive location for delivering all kinds of items. Throughout the specification, the mobile robot 314 may also be referred to as simply the robot 314.

In one aspect, when using the asynchronous approach used herein, the staff does not need to initiate a deposit of an item into the asynchronous delivery system 300 using the depot 302. Assume a pharmacist has an item ready to deposit in the depot 302 for delivery, and is about to walk over to the depot 302. If the mobile robot 314 just happens to be right next to the pharmacist at that time, the initial deposit of the item could occur within a drawer 316 of the mobile robot 314. A similar retrieval process could occur in which the item is identified, the destination is established, and any data necessary to deliver the item is retrieved from the mobile robot 314. This could save even more time. This process could be initiated by a voice command from the pharmacist, an electrical signal from a mobile device managed by the pharmacist, a near field communication from a mobile device, or any other initiation process in which the mobile robot 314 would initiate a process in which it acknowledges that it will be receiving an item for delivery to another location. In this scenario, the mobile robot 314 might deliver the item to the depot 302 for later retrieval from another robot or the robot 314 may delivery the item itself.

Figure 4:
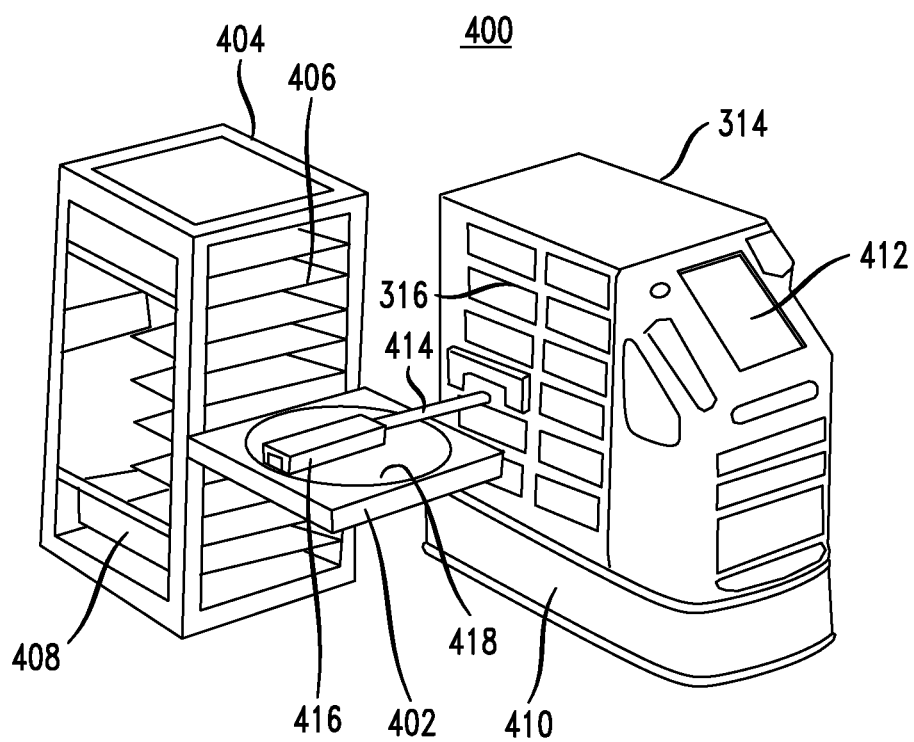
FIG. 4 illustrates a rack module and a swapping mechanism between the rack module and the mobile robot in the asynchronous delivery system disclosed herein.

The more standard application of the system 300 will be the staff depositing items with the depot 302. The robot 314 will autonomously retrieve the boxes from the depot 302, while dropping off any deliveries intended for that location. FIG. 4 illustrates a system 400 including the robot 314 and a swapping mechanism 402 which can both retrieve boxes from the repository 404, as well as deliver boxes from the set of boxes 316 of the robot 314 to the repository 404.

It is understood that the "system" disclosed herein can include any individual component such as the repository or depot 302, 404, the mobile robot 314, a server communicating with a depot or depots and/or a mobile robot or robots, and/or a combination of both components operating together. Any mechanical component which can be utilized to fulfill the functionality disclosed herein is included as part of this disclosure. For example, the particular structure of the repository 302, a particular structure of a box or drawer which can be swapped out between the mobile robot 314 and the repository 302 or 404 is also included. The swapping mechanism 402 can also be configured or created with different structures, or different mechanical capabilities, but which can still perform the basic functions of swapping boxes between the mobile robot 314 and the repository 302, 404.

One example of the swapping mechanism 402 is shown in FIG. 4. The swapping mechanism can include several components. An arm 414 can be configured to extend and retract the swapping mechanism 402 for exchanging drawers and/or batteries. In its retracted position, the swapping mechanism 402 could be folded and held within one of the drawer slots 316 of the mobile robot 314. The arm 414 can be used to extend engaging module 416 and the rotating tray 418. These are example mechanisms, and by no means are meant to be exclusive of the type of swapping mechanism that could be implemented. Engaging module 416 is used to retrieve a drawer from a depot (or repository) 404 (from one of the slots 406) and transport the drawer to one of the slots 316 of the mobile robot 314. The depot 404 could be similar in structure to the depot 302 shown in FIG. 3. The swapping mechanism 402 could of course also retrieve a drawer from the mobile robot 314, and deliver it to the depot 404. The same swapping mechanism could be used, to retrieve and exchange batteries on the mobile robot 314. The rotating tray 418 can be used as a platform on which to retrieve a drawer from the depot 404 and then rotate the drawer into a position to be inserted into a slot in the mobile robot 314.

The arm 314 could also be positioned or operable to retract the swapping mechanism 402 such that it is flush with an exterior surface of the mobile robot 314. The engaging module 416 can include a number of different types of structures for engaging with a drawer for retrieval and delivery. For example, engaging module 416 can use magnets, a grabbing mechanism, a snapping mechanism, a Velcro mechanism, suction cups, a docking mechanism, or any other kind of mechanism that can be used to access and retrieve a drawer from a slot in the depot 404. The swapping mechanism 402 could also be configured on the depot 404 instead of the mobile robot 314. In another embodiment, part of the swapping mechanism could be in the depot 404 and part could be in the mobile robot 314.

Each of the repository 404 and the robot 314 include a computerized control system which includes a processor, memory, bus, and other components as shown in FIG. 1 for performing the asynchronous delivery concepts disclosed herein. Non-transitory computer readable storage devices can store machine-readable instructions which, when executed by a processor, will perform the operations disclosed herein, and control the system and the mechanical components thereof.

Staff will be free to load and retrieve deliveries when convenient without interrupting their natural workflow, while robots 314 will be able to optimize their movement throughout the facility without having to wait to be serviced by a staff member. The staff can load an item to either the depot 404 or the mobile robot 314 as well as retrieve items from either the depot 404 or the mobile robot 314. With respect to retrieving an item directly from a robot, the system can track movement of individuals such as a doctor walking through the hallway. A mobile robot 314 can be moving through the hallway and the system can identify that a delivery of an item in one of the drawers of the robot is in process. For efficiency, the system can instruct the robot 314 to deliver the item directly to the doctor in the hallway rather than delivering the item to a destination depot. The doctor could receive a notification on a mobile device that indicates that the medicine needed for a particular patient is in the mobile robot 314 and the proper drawer can be opened such that the medicine can be efficiently retrieved.

Another aspect of potential wasted time which can decrease efficiency is the charging time for a battery on a robot 314. Another aspect of this disclosure includes the ability of robots 314 to be able to autonomously swap their batteries, eliminating the wasted time sitting on a charger and significantly reducing battery weight and costs. In one aspect, the repository 404 can include in the lower portion, a battery charging station 408. The swapping mechanism 402 could also be used not only to swap boxes between the mobile robot 314 and the repository 302, 404, but could also be configured to swap a battery from a lower portion 410 of the mobile robot 314. In this scenario, the mobile robot 314 will not need to sit and charge battery for an extended period of time, but can merely swap out a drain battery for a freshly charged battery. The robot 314 could include a secondary battery which could be smaller than a primary battery and which could be maintained for the purpose of providing the energy necessary for swapping out the primary battery.

In another example and instead of (or complimentary to) swapping batteries, robots 314 can maintain an "inter-robot" communication therebetween (via an establishment's wireless network such as a hospital's wireless network) such that when a first robot 314 reaches a remaining power level that is less than a given threshold (which is a configurable parameter that can be adjusted based on experiments or empirical studies), a second robot 314 can approach and interface with the first robot 314, obtain the load of first robot 314 together with information on first robot's pick and delivery schedules and assume the responsibility for completing remaining scheduled tasks (deliveries and pickups) of first robot 314. The exchange of load between the first robot 314 and the second robot 314 can be via the first robot's or the second robot's corresponding swapping mechanism such as the swapping mechanism 402 described above.

Alternatively and instead of all robots communicating their power level (battery level) status among themselves (i.e., the "inter-robot" communication described above), there may be a "central controller" within a particular establishment (e.g., a central computer station within a hospital facility) that continuously communicates with each robot 314 operating within the facility and monitors the power level thereof. In other words, the "central controller" implements a fleet management algorithm for robots 314 operating within the facility. Upon detecting that the power level of any robot 314 falls below the above-described threshold, the "central controller" can send appropriate commands and instructions to an available robot 314 to approach and take over the load and the responsibility of completing the remaining task of the robot 314 whose power level has fallen below the threshold.

While FIG. 4 illustrates the position of the battery at the repository 404, as being near the bottom, of course, the particular location of the battery could be in any position in the repository 404 or in the mobile robot 314. The battery could be also shaped like the box that is swapped between the repository 404 and the mobile robot 314. Thus, the swapping mechanism 402 could be the same for swapping boxes or batteries. One or two particular bays that are part of the group of bays was received boxes in the mobile robot 314 could be configured to receive a battery which can be used to run the mobile robot 314.

The asynchronous approach disclosed herein can also be complimentary to or even eliminate the need for pneumatic tube systems. While slower than a tube system for point to point deliveries, this system can handle a much wider variety of locations and object weights and sizes without the expensive and inflexible pneumatic tube infrastructure. In one aspect, the repository could receive a cylinder this delivered through a pneumatic tube system. The repository 302 could be configured such that users deliver items for the repository 302 via a pneumatic tube system. In this case, the "boxes" would likely have a more cylindrical shape. In this scenario, the mobile robot 314 and the swapping mechanism 402 can be modified for different shapes of boxes which need to be swapped between the repository 302 and the mobile robot 314. The system could also enable the swapping of containers of different sizes and shapes between the repository 302 and the mobile robot 314.

Another aspect of this disclosure is to quantify the benefits of asynchronous over synchronous package delivery using simulation. The benefit of the asynchronous approach over synchronous robot use is simulated based on real hospital logistics data taken from current logistics robot use. The number of interruptions to staff, the amount of wasted time for staff and the number of robots required is compared for each scenario. In one aspect, machine learning can be used to utilize real hospital logistics data from the existing logistics robot use, to seed machine learning algorithms which can then be implemented in an asynchronous retrieval and delivery system. The timing of robotic access to items deposited within the repository 302 as well as the delivery of the items via the robot 314 can be controlled or guided by a machine learning algorithm. For example, the real hospital logistics data can indicate that on the night of the Super Bowl sporting event that the need for certain hospital supplies dramatically increases. The logistics data can track the movement of items throughout the hospital as well as staff and robots. Based on the learning achieved by a machine learning algorithm, the control of the repository 302 and the mobile robot 304 can include one or more of the following parameters: (1) a timing of when the mobile robot 314 picks up one or more items from a repository 302; (2) a location within a bank of boxes within the repository 302 to position a particular item or items (3); a route the mobile robot 314 takes to retrieve items from a repository 302 or deliver items to a destination location; (4) pauses or stops along the way for a mobile robot 314; (5) a speed or variable speed of the mobile robot 314; (6) morning sounds or communications from the mobile robot 314; (7) variations in menu systems presented to users or interacting with the repository 302 and/or a mobile robot 314; (8) which items to retrieve, from a bank of boxes in the repository 302, or which items to deliver from the mobile robot 314 to the bank of boxes 302; (9) whether the mobile robot 314 will be used for direct retrieval and/or delivery of items to staff, and/or (10) whether to swap out a battery from the mobile robot 314. Data for machine learning purposes can also include feedback from users in hospitals, written surveys, interviews, and studies of planned workflows. System 302/314 components will house secure, swappable drawers and batteries as well as automated loading and retrieval mechanisms. For example, the Tote Retrieval System (TRS) by Vecna Technologies could be utilized as the swapping mechanism between the mobile robot 314 and the repository 302.

Figure 5:
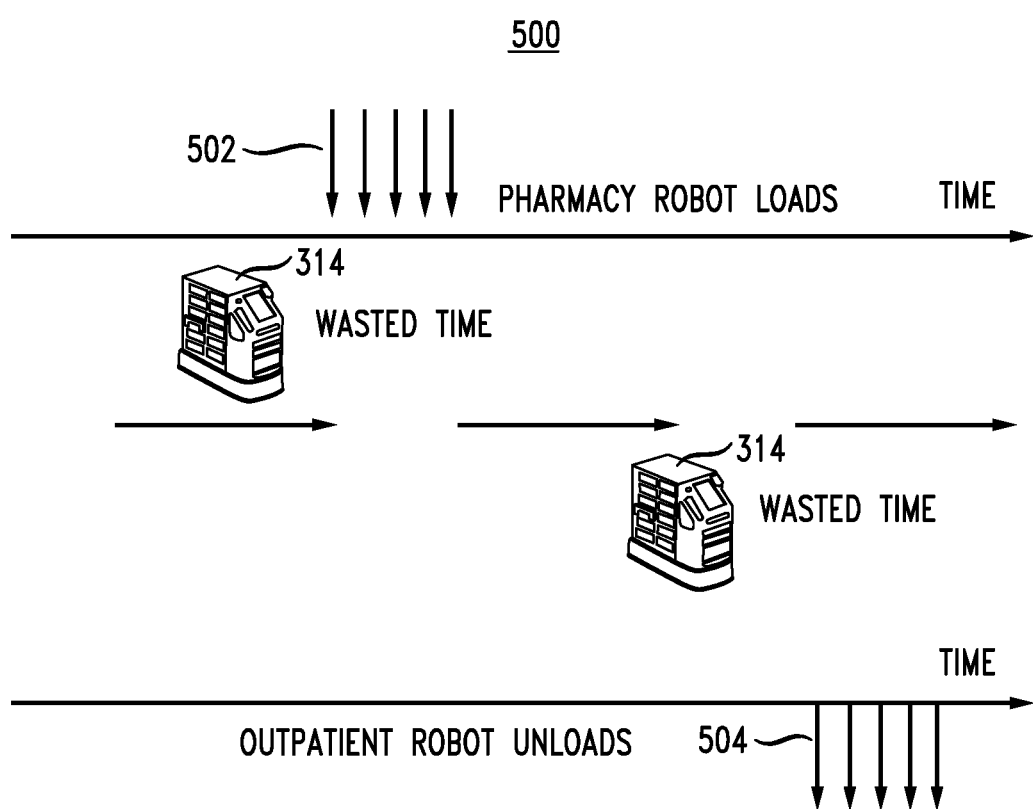
FIG. 5 illustrates a diagram of synchronous loading and delivery of items.

FIG. 5 illustrates the current state of the art with respect to delivery and pickup timing. FIG. 5 shows synchronous deliveries which concentrate all loading/unloading to a single point, creating a bottleneck and wasting both human and robot time. In this example, the mobile robot 314 will be loaded at a pharmacy with medicine and deliver the payload to a destination site. Time moves from left to right in this graphic. The graphic illustrates a synchronous workflow that requires more staff attention. The mobile robot 314 first goes to the pharmacy for loading 502. Given the synchronous operation, when the robot arrives at the location 502, a staff person has to unload the items in the robot 314 before it can move to its next delivery. This requirement represents wasted time because staff individuals are pressed to perform the unloading at a time when they should be doing other things such as direct patient care. A staff individual also is likely to load some items into the robot 314 at that time. After the individual, the pharmacy loads the robot and unloads any items at that station, the robot then moves to the unloading destination 504, at which time another staff individual at that location must unload the materials loaded at the pharmacy 514. Again, this unloading requirement can be an interruption to the staff individual's workflow.

Figure 6:
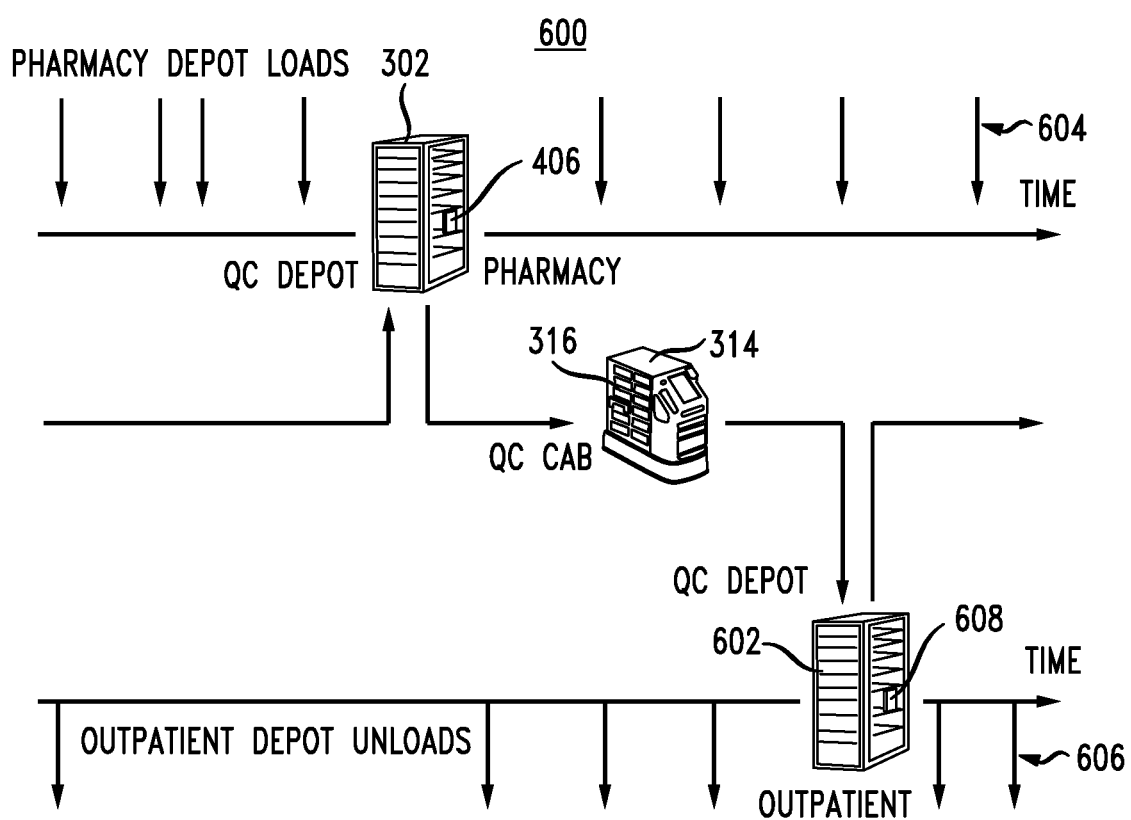
FIG. 6 illustrates a diagram of asynchronous loading and delivery of items according to the asynchronous delivery system.

FIG. 6 illustrates the innovation of a modular platform 600 independent drawer swapping unit that overcomes the synchronous interruption issue. Delivery robots 314 travel between and automatically dock with the depot 302. Drawers are swapped between the robot 314 and the depot 302. Humans can load and unload items from depots 302 using an interface and at their own schedule. Wireless communication with a hospital's computer system directs the robot towards priority delivery locations. The robots 314 can also have their own peer to peer scheduling approach. FIG. 6 illustrates the robot 314 leaving a depot 302 after making an autonomous delivery. The robot 314 interacts with the depot through retrieving an item from a location 406 in the depot 302 and humans interact with the depot 302 through the touch screen interface (e.g., touch screen 304 described with reference to FIG. 3). An open box 406 is shown as part of the depot 302 ready to receive content. The box 406 generally represents the approach to receiving items at the depot 302 for delivery by the robot 314. The box 406 would be closed, inserted into a bay or slot behind the box 406, and a recipient and delivery time would be entered into a touchscreen at the depot 302. In the asynchronous natural workflow, the depot 302 could be provided at a pharmacy. Various storage bins such as boxes 406 are provided within the depot 302.

Feature 604 represents the asynchronous loading operations of the pharmacy into the depot 302. Pharmacists, lab technicians, and other staff will first authenticate using their facility's standard user identification method (i.e., one or more of the following: barcoded or magnetic cards, biometrics, passwords, RFID etc). Once identified to the system, the user will specify the destination and type of delivery. Based on this initial information, the depot 302 will select an appropriate drawer and retrieve it. Users then use a barcode scanner to scan each item before placing it in the compartments in the drawer 406. The depot 302 compiles a manifest for each drawer that lists its ID, items in the drawers, destination, and any special instructions for delivery. Users enter these special instructions through the workflows.

Next, the user designates the delivery destination for individual compartments or entire drawers. The depot 302 has a sorting mechanism that routes the drawer to an appropriate position in the internal storage and tracks this location in memory for later retrieval. The user interface will also allow users to manually retrieve items from a drawer using the same authentication and scanning process, providing human oversight at both ends. The depot 302 then autonomously calls an available robot 314 to pick up the package(s) 316 and then will drop them off in a depot at the destination location 602. Independent of the human workflows on either side of the delivery process, robots 314 continuously pickup and transport deliveries between depots. Staff are automatically notified (via email, text, page, DECT, etc) when items are available.

The destination depot 602 will receive the package 316 and store the package in the appropriate drawer 608 which then can be retrieved by a staff individual at the destination location 602. Feature 606 represents outpatient depot unloads which can be asynchronous as well in the sense that a staff member can unload particular items as needed, such that the step individual is not required to unload items upon an arrival of the robot 314. Asynchronous deliveries allow staff to load and retrieve items when convenient for them rather than being forced to do it whenever a robot happens to arrive at their location.

Drawers for this system are configured for use by both humans and robots. A universal interface will allow both humans and the autonomous drawer swapping apparatus to remove drawers from the cabinet and depot 302 or from a respective robot 314. A secure electronic locking system safeguards each respective drawer contents and prevents unauthorized access. Batteries for the mobile robot will have a similar form factor to the drawers such that the swapping apparatus can swap drained batteries with freshly charged batteries. In one aspect, each slot of a depot 302, which receives a drawer can be configured to receive and charge a battery having a similar form factor as a drawer. An electrical feed could be provided to each slot such that it can be convenient to remove the battery from the robot 314 and replace it with a charged battery. In the event that the robot's batteries are low on charge, the robot will indicate that it needs to swap batteries. The same swapping apparatus then retrieves a charged battery from the depot storage module and swaps it for the depleted battery on the robot; this depleted battery is routed into the storage module and charged.

Autonomous battery swapping is an enabler for the proposed system. It allows a hospital to use a single robot to provide continuous 24/7 service where two robots are required otherwise. In multi-robot applications, where an average eight-hour runtime requires a minimum of a two hour charging period (25%), the increased robot requirement scales with the ratio of charge time to run time. Thus, an operation with 12 continuously-operating battery-swapping robots would require at least 15 conventionally re-charging robots. The battery swapping ability also significantly reduces battery costs in two ways. First, since robots can swap batteries easily, batteries no longer need to be large enough to run continuously for long periods of times. Second, since the robots will be able to use a battery optimally, and the batteries will be able to charge optimally, longer battery life will be achieved, also reducing cost and waste.

Figure 7:
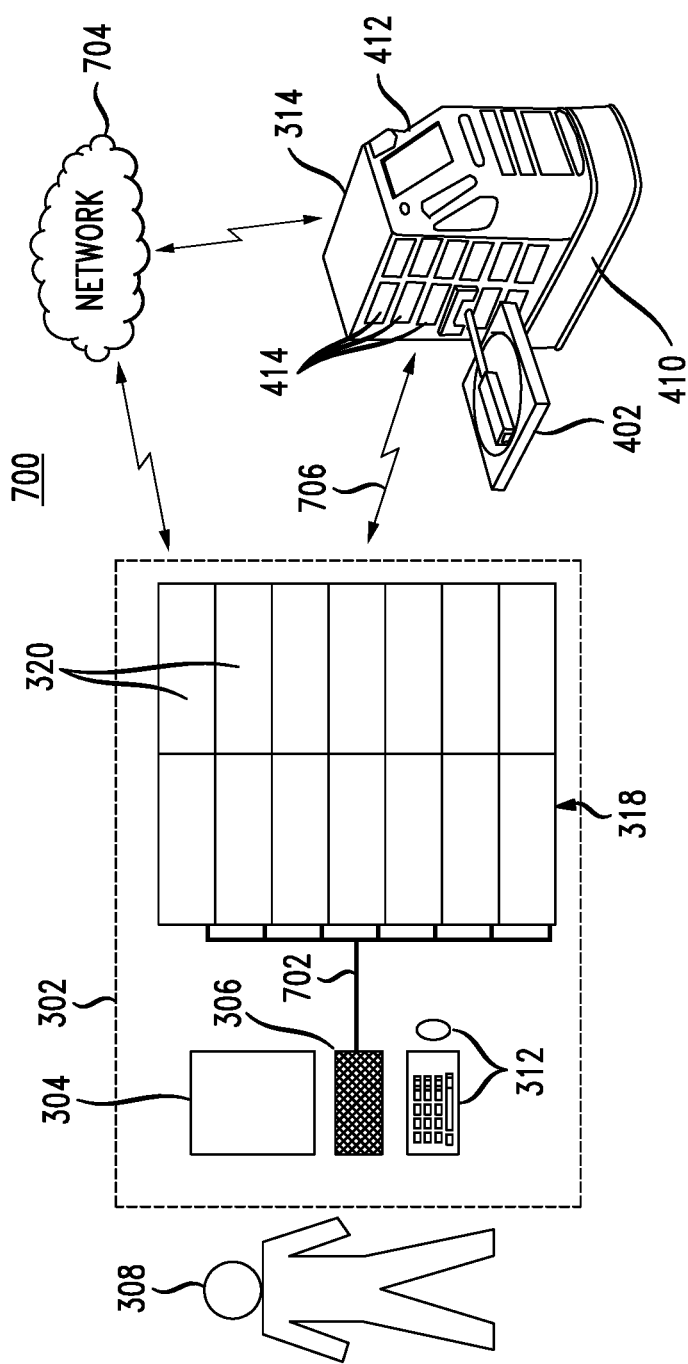
FIG. 7 illustrates communication aspects for the asynchronous delivery system.

FIG. 7 further illustrates the interaction of the depot 302 and the robot 314. The robot 314 utilizes a modular, platform-independent cabinet for mounting on the delivery robots. The number of available bays 414 in the robot 314 for drawers is configurable based on the needs of the facility, the type of deliveries the robot will make, and the type of robot used. The bays 414 can be consistent in their configuration, or can vary. For example, the group of bays 414 might include a set of large sized bays and a set of small size bays. Some delivery items might need to have their own separate box and be stored in a separate bay from other items. Such items could be provided into a box of a smaller size within the description system. Loading and unloading of drawers from the cabinet in the robot 314 or in the depot 302 is automated and requires no human intervention. However, staff may manually access the contents of a drawer or remove it after authenticating through the touchscreen 412 and peripherals on board the robot 314. As noted above, for efficiency, a robot 314 may recognize that a doctor or staff member that needs an item on-board that is being delivered to a destination depot is in the near vicinity of the robot 314 and provide a direct delivery of the item, thus bypassing the destination depot. A fleet of robots can continuously operate 24 hours a day, returning to the depots to swap out empty drawers for full/partially full drawers.

The depot 302 features separate interfaces for humans 308 and robots 314. The depot 302 consists of three modules: the user interface module 304, which contains the touchscreen 314, peripherals 312, and manual loading bay 306; the rack modules 318 which house drawers 320; and the drawer-swapping module 702. These interconnected modules rely on the internal sorting mechanism that receives drawers through either interface, routes them to the proper slot in the rack module 318, and stores them in one of the bays 320. The same mechanism also retrieves the correct drawer from the storage rack modules and outputs it for human retrieval or automated swap with a drawer in the mobile cabinet on the robot 314. The particular mechanical approach to physically moving drawers from rack modules to and from the manual loading bay 306 of the depot 302 can vary.

Robots 314 docks with the side of the depot 302 and communicates with it over the hospitals' wireless network 704 or directly to describe its current payload (number of full drawers, number of empty drawers, and destinations for each non-empty drawer). The network 704 can represent a number of different components within the environment. It can represent a wireless network, a server, a database, a routing management module as discussed below, or any other network-based component which interacts with one or both of the depot 302 or the robot 314 to facilitate the retrieval of items within drawers, the storage of drawers, the swapping of drawers between the depot 302 and the robot 314, and ultimately delivery of the respective drawer to its destination site.

The robot 314 could also communicate 706 directly with the depot 302 via a near field communication, Bluetooth, or any other wireless protocol. The drawer swapping apparatus 402 then retrieves from the depot 302 an appropriate drawer (e.g., one going to the same destination as the others in the robot's payload unit, or the next available drawer for delivery) and swaps it with the empty drawers 414 on the robot 314. This process repeats until the robot has a set of full drawers (or there are no more full drawers available for delivery). Empty drawers are routed back into the storage modules.

Additional storage modules can be added to a depot 302 as needed to house a greater number of drawers 320. To minimize the footprint of the depots 302, a depot may be installed flush with a wall. Additionally, if the robot's entry into a pharmacy or lab would be disruptive, the robot interface for the depot may be located on the other side of a wall. Some depots will service only a fraction of total traffic and thus may only need one or two rack modules. Transfers can also occur between depots to balance out stock levels between care units. When a robot 314 makes a delivery to a depot 302, it docks and indicates to the depot 302 which drawers are intended for that delivery. The depot exchanges those drawers for empty drawers in its own storage, or full drawers that should be transferred to other depots. The robot then continues to the new delivery point.

There are number of decisions made between the depot 302 and robot 314, and alternately in connection with a processing system 704 associated with the hospital, that can be made based on machine learning and historical workflows. For example, one or more of the following decisions can be made based on machine learning or some other factor: (1) where to store drawers in a rack module 318, or on the robot 314; (2) whether to swap out a battery from the robot 314 while stationed at a depot 302; (3) which bay to store a battery in or which bay should receive a battery for charging in the depot 302; (4) whether the robot 314 needs to retrieve one or more drawers for movement to another depot 302; (5) scheduling times for delivery, a speed of the robot 314, a route of the robot 314, pauses or stops made by the robot 314; (6) whether a direct human retrieval or delivery of an item by the robot is expected, scheduled, or not likely, and so forth.

In one aspect, a system 704 could include an intelligence routing and delivery management module, which can schedule the movement of robots 314 throughout the environment. For example, the routing module 704 could receive expected routing paths for one or more robust 314 with their payloads and delivery destinations included within data provided to the routing module 704. The routing module 704 could receive data about other activity within the environment, such as scheduled surgeries, scheduled patient movement, machine learning data on expected new individuals to be received at the hospital, expected discharges of patients, and so forth. Outside data such as holiday schedules, weather information, could be used as part of the machine learning algorithms. The routing module could then schedule the movement of a robot 314 with respect to one or more of its location, expected activity along the path of the route, expected individuals along that path (i.e., could the robot do a direct delivery to a doctor), and a particular time associated with the location. The routing algorithm 704 could divide up the physical environment into individual components of varying sizes or slices and associate a time of day with each physical slice. The routing module 704 could include machine learning patterns of the use of each individual slice of physical space with respect to time. Thus, when the routing module 704 would receive a potential scheduled route for a particular robot 314, which would place the robot, for example, in space slice 58 at time 11:32 AM, the system can determine that there is a likely chance of that space being occupied by a patient, another robot, or an individual. The system could determine the likelihood of a person who wants a delivery to be at that location. Thus, the routing manager 704 could adjust the movement of the robot 314 such that a collision or interruption is less likely at any given space slice within the environment as well as providing a potential direct delivery of an item to a recipient staff member without the need of delivering the item to the destination depot.

When making such routing decisions with respect to the movement of a robot 314 through the environment, the routing management module 704 could also utilize a priority of payload on the robot 414. For example, one drawer may include surgical instruments that need to be at a particular surgery at a particular time with a high priority. Another drawer may include aspirin to be delivered to a particular destination for ensuring that an aspirin supply is sufficient. The aspirin delivery may be merely for backup and have a lower priority than the surgical instruments. The routing of the robot 314 can thus be based at least in part on a priority of any individuals respective items within a drawer, a pathway to a destination for each respective drawer, a priority indicated by a user, a modified priority based on data received after an item is retrieved by the mobile robot 314, and so forth. For example, a box of surgical instruments may be retrieved by the robot 3144 delivery at a surgical destination for a surgery scheduled for the next day. The delivery may have a medium level priority inasmuch as the surgery is still twenty-four hours away. However, if an emergency happens and the surgery gets moved up to the current day, a notification to go to the routing manager 704 which can change the priority of that delivery to immediate or high-priority delivery. In such case, the movement of the robot 314 would be modified such that the surgical instruments would be delivered next, in preparation for the surgery.

Thus, routes for the robot 314 can be static or may be dynamic and adjustable based on current conditions or trigger actions which can cause a change in the route, speed, priority, or other parameter associated with the robot 314. The route can be established and set (i.e., static) before the route is taken by the robot such that the system can expect a certain timing and route taken throughout the delivery. Or, in another aspect, the system can dynamically adjust the route based on new data received. The change in the route of one robot 314 can also trigger an alteration of routes of one or more other robots as well. Such a change can also cause other events or movement within the hospital to be adjusted as well. For example, in a more complete system management, other adjustments such as surgical times, door opening timings, staff movement, elevator speeds, elevator management and so forth could also be incorporated into the movement of robots 314 and the routing of robots 314 throughout the environment for increased efficiencies. For example, if a robot 314 has an urgent set of surgical instruments to be delivered, the system 704 can cause an elevator to stop at a proper timing on the right floor to pick up the robot and deliver the robot to the destination floor with reduced delay or on a different floor schedule than entered in my staff or humans riding the elevator.

Analysis of the environment to achieve machine learning models or other data which can be utilized to deliver items through the depot/robot system can include prepared delivery data from a facility that will be fed into a simulation for each scenario. Part of the data preparation can include estimating some factors such as the time when items were actually ready to be loaded versus when the items were loaded into the robot 314. The analysis can be done with a mathematical model based on staff observations and feedback to find the appropriate range, and a random distribution will be used to augment the data.

Setting up a simulation of items being delivered through the environment can include modeling the environment with accurate dimensions, realistic package distribution, pick-up and drop-off locations, known constraints, elevator movement, door opening timings, surgical schedules, and an understanding of traffic patterns for the robots 314. Collaborators can provide data from existing delivery robots and details necessary to ensure that the environment modeled in the simulator is correct. The simulation can be validated by modeling current live workflows at collaborators' facilities using synchronously or asynchronously transported materials to establish a benchmark to compare against the improved solution. Running a scenario can consist of executing multiple iterations where various parameters will be adjusted such as number of robots used, average speeds, and fleet management configurations. The machine learning models can eventually predict patterns of usage which can be utilized to schedule movements of robots 314 throughout the environment. The evaluation of a scenario can consist of reviewing each iteration against a set of metrics that the team and collaborators agree upon, such as whether the scenario was able to meet or exceed the desired throughput, the average delivery time of packages, and number of times and durations that staff interact with different parts of the system.

For each scenario, a comparison can be made of staff interruptions, staff wasted time and the minimum number of robots required when utilizing robots in a traditional manner with synchronous delivery, and when utilizing robots with the battery- and box-swapping technology for 24/7 asynchronous delivery. The results can be analyzed to test the hypothesis that see if the system would offer hospitals a significant benefit over the current approach. The new depot/robot system reduces interruptions, decreases non-productive time for staff, and allows robots to be productive 24/7, requiring fewer robots to achieve the same throughput thus lowering the barriers to adoption.

More precision is required when aligning a robot 314 with the depot 302 to successfully swap boxes. Special alignment features are included in the depot 302 that can achieve needed accuracy. The swapping mechanism can require both horizontal and vertical motion such that boxes can be retrieved from different rows or different columns of the rack module 318. It is important that the depots be as thin and unobtrusive as possible to allow for easy installation in locations throughout existing facilities. Alternative mechanisms will be explored as necessary to achieve the goals. Common items needing to be delivered might somehow be incompatible with a secure box approach in size, weight, or environmental requirements. Thus, in one aspect of this disclosure, the boxes are designed to come in a variety of sizes and/or shapes. Refrigeration or other environmental controls may also be required. In one aspect, boxes can be configured to connect to a power supply was in the rack module 318. The box may have heating and/or air conditioning components which can be turned on or off based on the requirements of items within a respective box.

As noted above, while the hospital example is straightforward and understandable, the scope of this disclosure is certainly beyond a hospital application. A warehouse, a department store, a grocery store, a bank, or any kind of industry in which items need to be delivered from one location to another, can utilize the principles disclosed herein.

Figure 8:
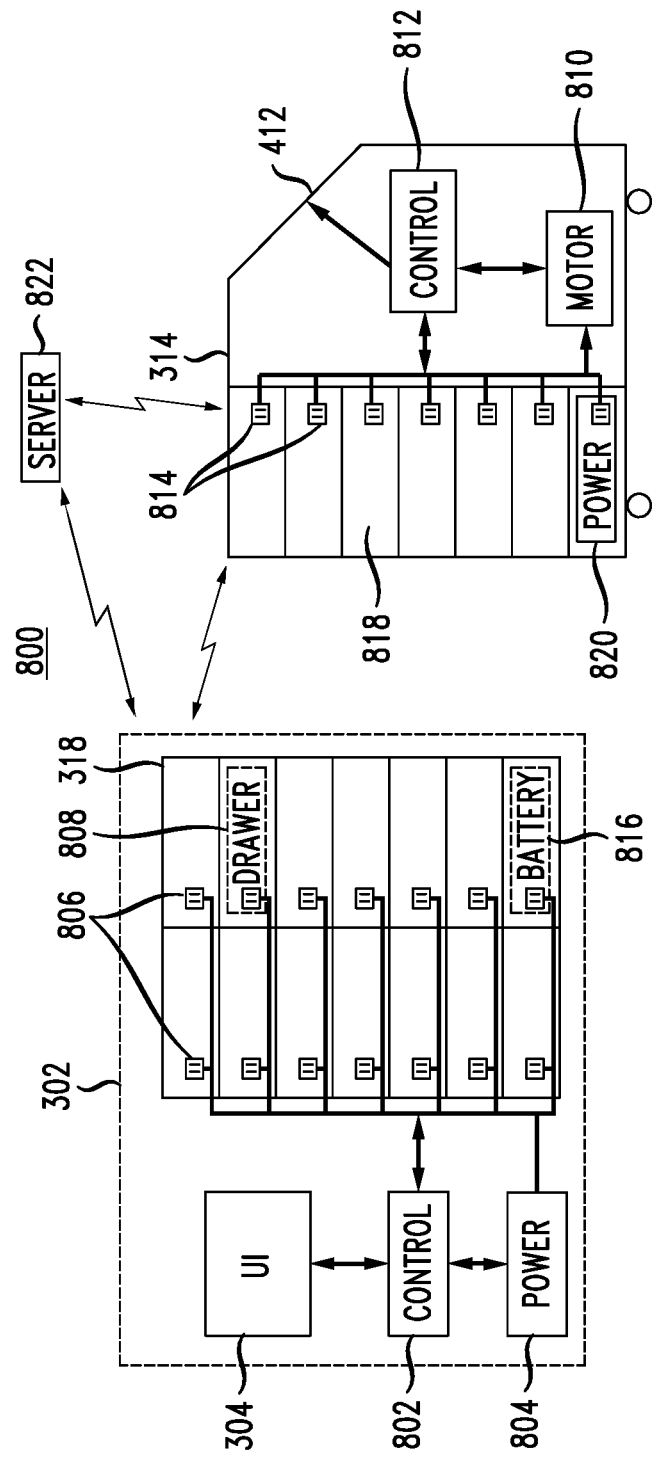
FIG. 8 illustrates power and control components of the asynchronous delivery system disclosed herein.
Figure 9:
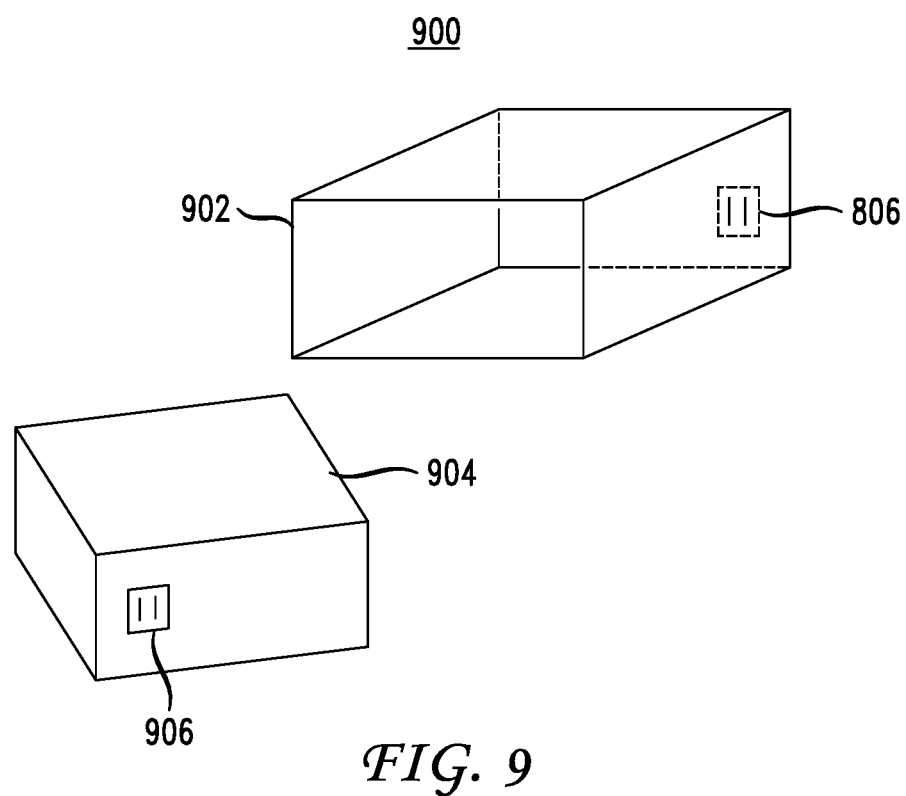
FIG. 9 illustrates an example battery and battery slot configuration.
Figure 10:
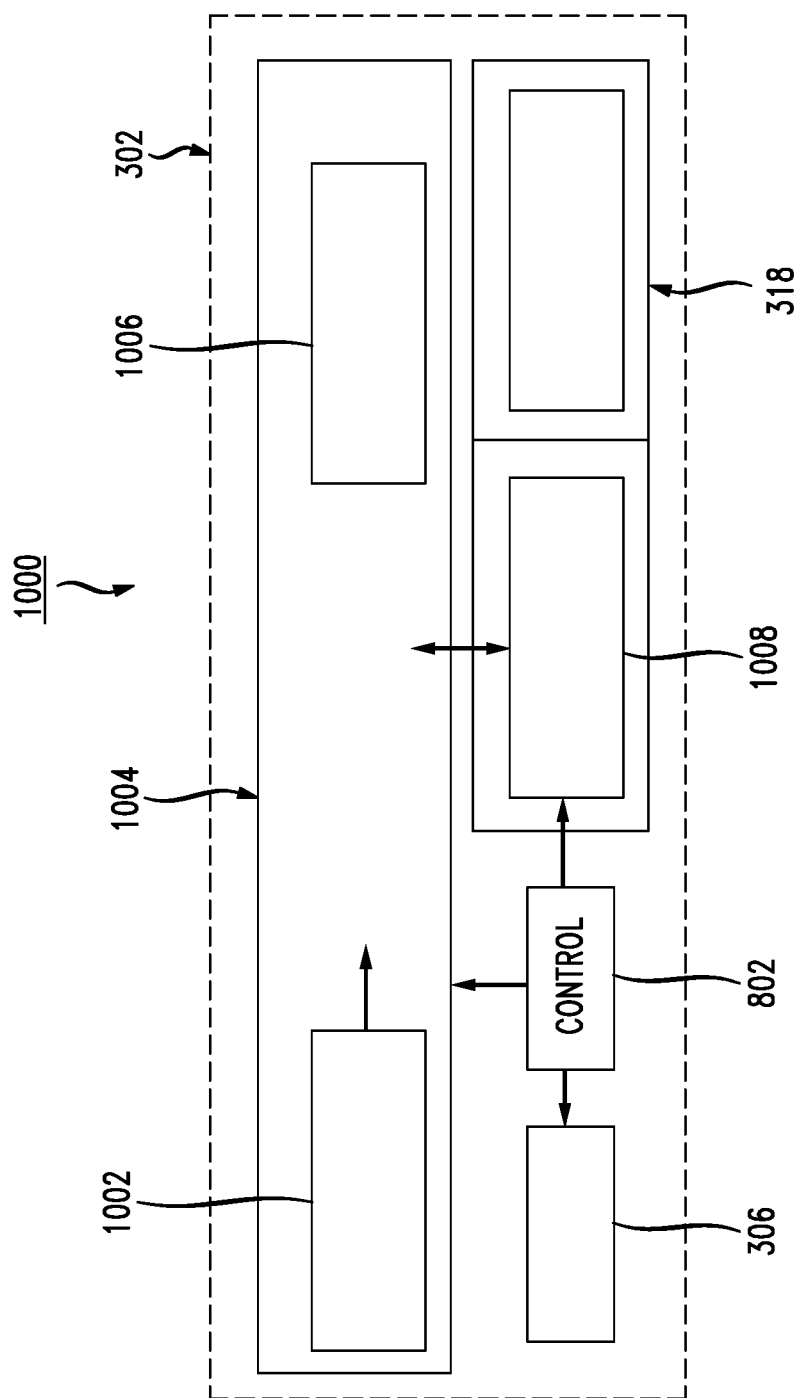
FIG. 10 illustrates a top view of a depot and rack module for moving and positioning drawers within the depot.

FIGS. 8-10 illustrate other aspects of the system. The system 800 shown in FIG. 8 includes a depot 302 having a depot user interface 304, a rack module 318 that houses drawers 808, a battery 816, a depot drawer-swapping module with a control system and a depot battery-swapping module with the control system 802, a power supply 804. Module 802 in FIG. 8 represents the drawer-swapping module, the battery-swapping module and the control system. The depot control system 802 connects to and controls the depot user interface 304, the rack module 318, the depot battery-swapping module and the depot drawer-swapping module. Feature 806 represents the depot 302 providing power to each slot in the rack module 318. In this way, each slot can either hold a regular drawer with items or a battery for charging.

A mobile robot 314 includes several components represented by module 812. This includes a mobile drawer-swapping module 812, a mobile battery-swapping module 812, a user interface 412, and a mobile control system 812 that connects and controls the mobile drawer-swapping module and the mobile battery swapping module. The robot 314 also includes a motor in communication with the control system 812 for moving the robot 314 to its designated locations. The depot 302 and the mobile robot 314 function in a coordinated manner to provide an asynchronous item delivery system. The depot 302 and the robot 314 perform operations including one or more of receiving, at the depot 302 and via the depot user interface 304, a specification by a user of a destination depot and an item for delivery to yield item delivery data, selecting, based on item delivery data and the by the depot control system 802, a drawer 808 from the rack module 318 that houses drawers, receiving the item in the drawer, communicating, from the depot 302 and to the mobile robot 314, a message to pick up the item, swapping a first battery 820 on the mobile robot 314 with a second batter 816 charged by the depot 302 via the depot battery-swapping module and transferring the item from the drawer 808 in the depot 302 to a drawer 818 in the mobile robot 314 using the depot drawer-swapping module 802 and the mobile drawer-swapping module 812 and delivering, by the mobile robot 314 using its motor 810, the item to the destination depot.

The depot 302 can include power 804 provided to each slot in the rack module 318. Power can be supplied via charge providing connection(s)/power outlet(s) 806 to any one or more slot in the rack module 318. FIG. 8 shows a battery 816 in a lower slot of the rack module 318. However, given the asynchronous nature of the access and delivery system, it can be desirable to enable flexibility in which a battery could be deposited in any slot within the rack module 318 for charging. Accordingly, the rack module 318 can be configured with dedicated slots for battery charging or can provide power to every slot (via one or more charge providing connections 806) such that there is flexibility in depositing a low battery and any slot for charging. A server 822 can be used to communicate with the various components of the system to coordinate the supply chain process and manage the movement, receipt, and delivery of items throughout the environment. The system 822 can also communicate with outside sources of data such as wholesale providers of items such as medicine and surgical instruments such that scheduling can even occur on a larger time scale. For example, the system 822 can receive information that a delivery of aspirin scheduled or expected on Tuesday is going to be delayed until Thursday. Such information from an external source and related to an item that moves through the supply chain can cause scheduling algorithms to make adjustments to one or more of a mobile robot route, an asynchronous delivery or pickup schedule, or other components and scheduled items within the hospital environment.

FIG. 9 illustrates components 900, which include a slot 902 shown with power outlet 806 available to charge battery 904 which has its corresponding power component 906. FIG. 9 illustrates that the battery 904 can have a configuration that is similar to a drawer configuration such that it would fit in any slot 902 within the rack module 318. Thus, in one aspect, a battery swapping module 812 and a drawer swapping module 812 can essentially be the same module on the mobile robot 314. The mechanical structure of the swapping module 812 can be the same if the drawer configuration and the battery configuration are the same or essentially the same.

This disclosure presents another discussion of the system with reference to FIGS. 8 and 9. In one aspect, the "system" can refer to an asynchronous item delivery system including a depot 302 having a depot user interface 304, a rack module 318 that houses drawers 808, a depot drawer-swapping module 802, a depot battery-swapping module 802 and a depot control system 802 that connects to and controls the depot user interface 304 and the rack module 318, the depot battery-swapping module and the depot drawer-swapping module. In one aspect, the depot drawer-swapping module 802 includes features such as the control system 802 as well as the configuration of the drawer 808, the configuration of the rack module 318 that stores the drawers, and the mechanical capabilities to enable a component of the mobile robot 314 to be able to retrieve a drawer 808 from the rack module 318.

In one aspect, a mechanical arm or drawer swapping module 402 is configured within the mobile robot 314. However, it is noted that the mechanical components for swapping a drawer from the depot 302 to the mobile robot 314 can also be configured within the depot 302. In this regard, within the depot, the depot drawer-swapping module 802 could include all of the mechanical components necessary to transition a drawer 8 await from the rack module 318 of the depot 302 to a receiving slot 818 within the mobile robot 314.

The an asynchronous item delivery system can include a mobile robot 314 including a mobile robot drawer-swapping module 402, a mobile robot battery-swapping module 402 and a mobile control system 812 that connects and controls the mobile robot drawer-swapping module 402 and the mobile robot battery-swapping module 402. The depot 302 and the mobile robot 314 can operate in a coordinated manner to asynchronously deliver an item from the depot 302 to a destination depot by performing operations including receiving, at the depot 302 and via the depot user interface 304, a specification by a user of the destination depot and the item to yield item delivery data, selecting, based on item delivery data and the by the depot control system 802, a drawer 808 from the rack module 318 that houses drawers, receiving the item from the user via the depot user interface 304, communicating the item to the drawer 808 within the rack module 318 that houses drawers, communicating, from the depot 302 and to the mobile robot 314, a message to pick up the item, swapping a first battery 808 on the mobile robot 314 with a second batter 816 charged by the depot 302 via the depot battery-swapping module 402 and the mobile robot battery-swapping module 402, transferring the item from the drawer 808 in the depot 302 to the mobile robot 314 using the depot drawer-swapping module and the mobile robot drawer-swapping module and delivering, by the mobile robot 314, the item to the destination depot. A similar process can also occur if a mobile robot 314 is receiving an item into the supply chain process for delivery. In this case, the item would be directly placed within a drawer and thus no drawer swapping would have to occur. In this scenario, the user can become familiar with the fact that whether at a depot or at a mobile robot, any depot of an item within a supply chain device will cause the item to be delivered.

The mobile robot battery-swapping module and the mobile robot drawer-swapping module can both be described as associated with feature 402 in connection with the control system 812 of the mobile robot. In one aspect, the same mechanical components 402 can retrieve and exchange both drawers and batteries in the scenario where drawers and batteries have a similar configuration. In another aspect, separate mechanical components could be utilized to separately manage the swapping of drawers versus the swapping of batteries. The advantage of using the same mechanical component 402 for swapping is simplicity of design. However, if a separate mechanical component is configured for respectively swapping drawers versus swapping batteries, then, the interface between the depot 302 and the mobile robot 314 in which the exchanges are taking place can be configured such that a drawer swap and a battery swap can simultaneously occur. This can speed up efficiency of the docking of the mobile robot 314 with the depot 302.

The asynchronous item delivery system includes a user interface 304 or component that is used to scan the item before receiving the item in the drawer 808. The user interface 304 can include a receiving component 306 that physically receives the item from the user 308. The asynchronous item delivery system preferably compiles a manifest for each drawer in the rack module 318 that houses the drawers. The manifest can include one or more of an identification of the drawer, items in the drawer, the destination, and instructions for delivery of the item. After receiving the item in the drawer 202/304, the depot 302 routes the drawer to a chosen position in the rack module 318 in preparation for retrieval by the mobile robot 314. The depot 302 can either receive the item and convey the item to a drawer 808, or can physically move the drawer to a position where the item can to be deposited therein in the drawer can be transitioned to a slot within the rack module 318. A similar manifest is generated when a user deposits an item with the mobile robot 314 for delivery.

The asynchronous item delivery system can deliver, by the mobile robot 314, the item to the destination depot using machine learning to schedule one of a route, a timing and a pace of delivering the item to the destination depot. For example, a server 822 can receive data from one or more of respective depots 302 mobile robots 314, and any other data with respect to the environment in which the mobile robot 314 must navigate to deliver the items or items. That data can be processed in the machine learning manner such that patterns and expectations can be developed in a routing model of the environment. As noted above, a three-dimensional physical box of space within the environment can be associated with a particular timeslot as well. A monitoring system could be deployed, which detects motion, movement, heat, electromagnetic energy, and so forth, to model each box of space relative to a particular time. Such modeling of the use of each respective boxes space per unit time in order to provide training data to a machine learning algorithm, which can then be utilized to schedule a timing, a routes, and any other characteristic associated with delivering an item via the mobile robot 314. The algorithm can also be used to manage components within the environment that the mobile robot 314 moves through for additional efficiencies. Thus, elevators, doors, escalators, lights, and so forth could be modified to aid in moving the mobile robot 314 through the environment for delivery or retrieval of items.

The asynchronous item delivery system can also include a second mobile robot for asynchronously delivering a second item. More than two mobile robots can also be deployed within the system and asynchronous manner for further efficiencies. In one aspect, one or more robots may be configured to operate in a synchronous manner, while others operate in an asynchronous manner, with an overall ecosystem. In another aspect, multiple mobile robots can be configured to operate in an independent manner, or in a coordinated manner via a centralized system 822.

FIG. 10 illustrates a top view of the depot 302. FIG. 10 will illustrate an example depot drawer swapping module 1006. When an individual deposits an item into the depot 302, individual can interact with the user interface and scan or identify the item and then receive the item in a receiving module 306. A control unit 802 can control the electrical and mechanical activities of the depot 302. Having identified the item, the depot 302 can receive the item into an input portal 306 for placing within a drawer 1002. Whether the depot 302 receives the drawer with the item already placed within it or receives the item, and causes the item to be deposited within drawer 1002, is immaterial to the present disclosure. Either configuration would work. Once the item is configured in a drawer 1002, the depot 302 must physically move the drawer 1002 into an appropriate position within the rack module 318. Component 1004 represents a depot drawer swapping module that enables the drawers to be moved between the user interface location and the input portal 306 and positions or slots within the rack module 318. Drawer 1002 is shown as moving from the input portal 306 to be positioned 1006 to be placed within a slot of the rack module 318. Drawer 1006 is shown as being in the position to move to or from the rack module 318 and to be able to move along the depot drawer swapping module 1004 from a slot within the rack module 318 towards the input portal 306 for providing the item to a user. While FIG. 10 represents a top view of the depot 302, it should be understood that the depot drawer swapping module 1004 can move drawers vertically as well as horizontally such that they can be positioned within an appropriate slot of the rack module 318, or retrieved from a particular slot in the rack module 318. Box 1008 is shown as being within a slot of the rack module 318, but movable or retrievable by the depot drawer swapping module 10044 moving either to another slot or for positioning at the port 306 for retrieval by a user.

The system can compile a manifest for each drawer in the rack module 318 that houses the drawers. The manifest can include one or more of an identification of the drawer, items in the drawer, the destination, and instructions for delivery of the item. After receiving the item in the drawer 1002, the depot 302 routes the drawer 1002 to a chosen position in the rack module 318 in preparation for retrieval by the mobile robot 314.

It is noted that embodiments of this disclosure can be provided in a variety of configurations. For example, one embodiment could simply be the depot 302 and its structure and functionality. In this embodiment, claims to be directed to one or more of the steps taken by the depot 302 to retrieve items, to manage the positioning of the items in respective drawers that are positioned within a slot of the rack module 318, and then to deliver the drawers to a mobile robot 314 an asynchronous manner, including the charging and delivery of a battery to the mobile robot 314. This embodiment can include any communication from the depot 302 to a separate device, including but not limited to the mobile robot 314, as well as any communication received from a separate entity at the depot 302 for performing the functions disclosed herein.

Similarly, another embodiment could be from the standpoint of the mobile robot 314. This embodiment would include the structure and operations from the standpoint of the mobile robot 314 only, such as receiving communication about a deposited item, physically moving the mobile robot 314 to a designated depot, utilizing a mobile robot drawer swapping module to retrieve a drawer containing the deposited item, placing the drawer in a slot in a rack module associated with the mobile robot 314, and delivering the drawer to a destination depot such that the mobile robot drawer swapping module retrieves the drawer from the rack module associated with the mobile robot 314 and deposits the drawer in a slot on a destination depot 302. Steps from the standpoint of the mobile robot 314 can also include delivering a battery from the mobile robot 314 from a slot in the rack module 318 of the depot 3024 charging and retrieving a charged battery from the depot 302 for use in running the mobile robot 314.

In an embodiment in which the mobile robot 314 can retrieve items from a user, the steps performed by the mobile robot 314 can include receiving an item into a drawer of the mobile robot 314 and receiving and recording data about a destination for the item, an identification of the item, and so forth. The mobile robot can then deliver the item to another individual directly or deliver the item to a destination depot.

The "system" disclosed herein can come in various forms. For example, one embodiment disclosed above defines the system as including one or more of a depot 302, a server 822, and a mobile robot 314. However, these different components may be provided by different companies. Accordingly, the "system" can be defined from the individual standpoint of the depot 302, a server 822, or from the individual standpoint of the mobile robot 314. The system from the standpoint of the server 822 can include the communications to and from the various components to provide controlling instructions about the efforts between the depot 302 and the mobile robot 314 to manage the supply chain. When an embodiment (method, system, or computer-readable storage device) is claimed from any standpoint disclosed herein, all of the steps, communications, instructions, and/or operations are performed from the spent standpoint of the respective system for the respective components.

In another aspect, the depot 302 could be configured in a different way. For example, a user interface would be configured such that the user could enter data about an item, scan the item, and the depot 302 could have a module that causes each drawer to open up from its slot and receive directly into the drawer from the user, in the assigned slot, the item for later retrieval and delivery by the mobile robot. Weight scales could be deployed as well to weigh the items and if the weight of the retrieved item is consistent with what is expected, then the item is confirmed. If there is a discrepancy between the weight and the expected weight, an alert can be provided to confirm that the item is the proper item.

Figure 11:
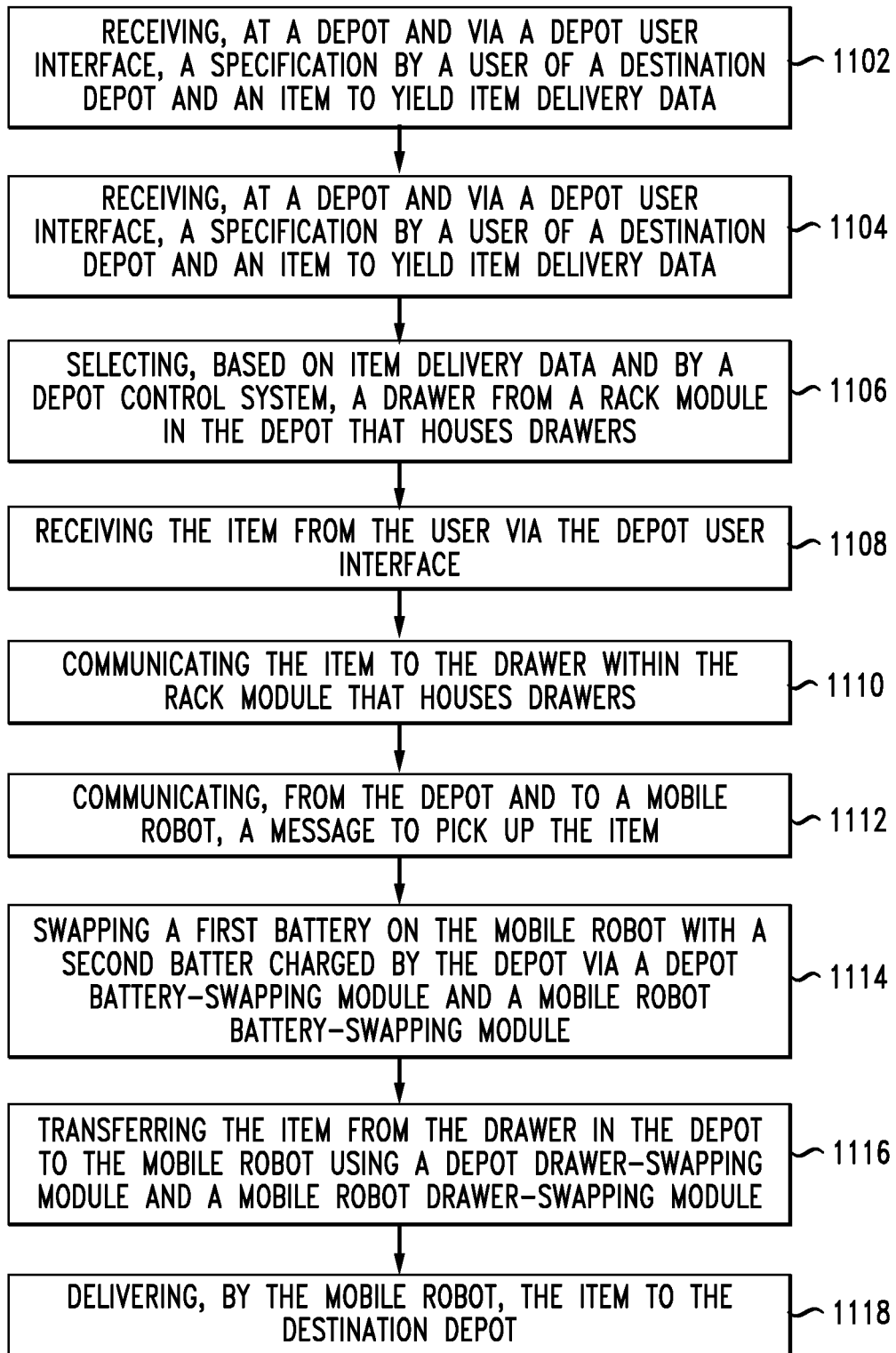
FIG. 11 illustrates a method embodiment in which both the depot and the mobile robot are part of the same asynchronous delivery system.
Figure 12:
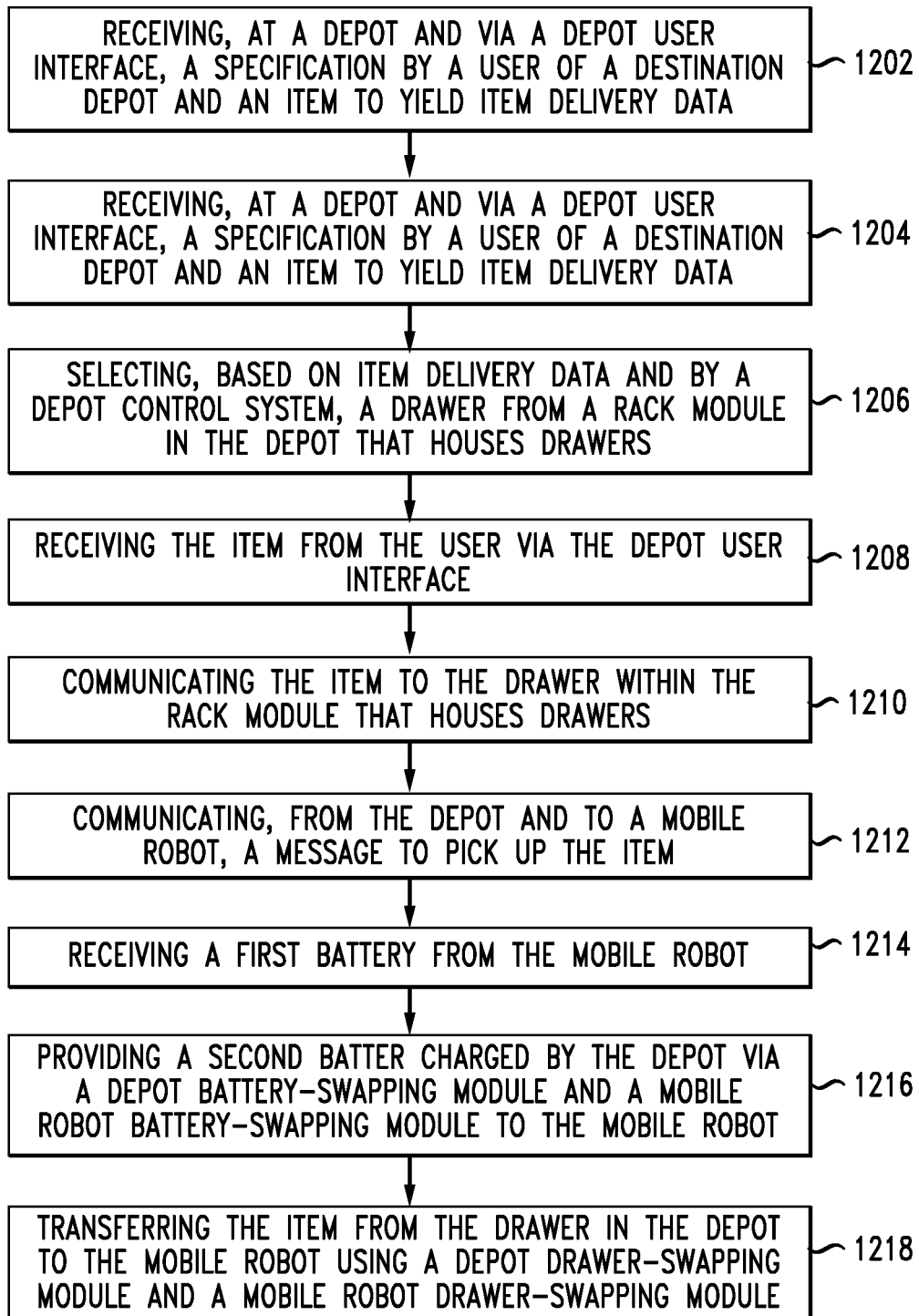
FIG. 12 illustrates a method embodiment from the standpoint of the depot.
Figure 13:
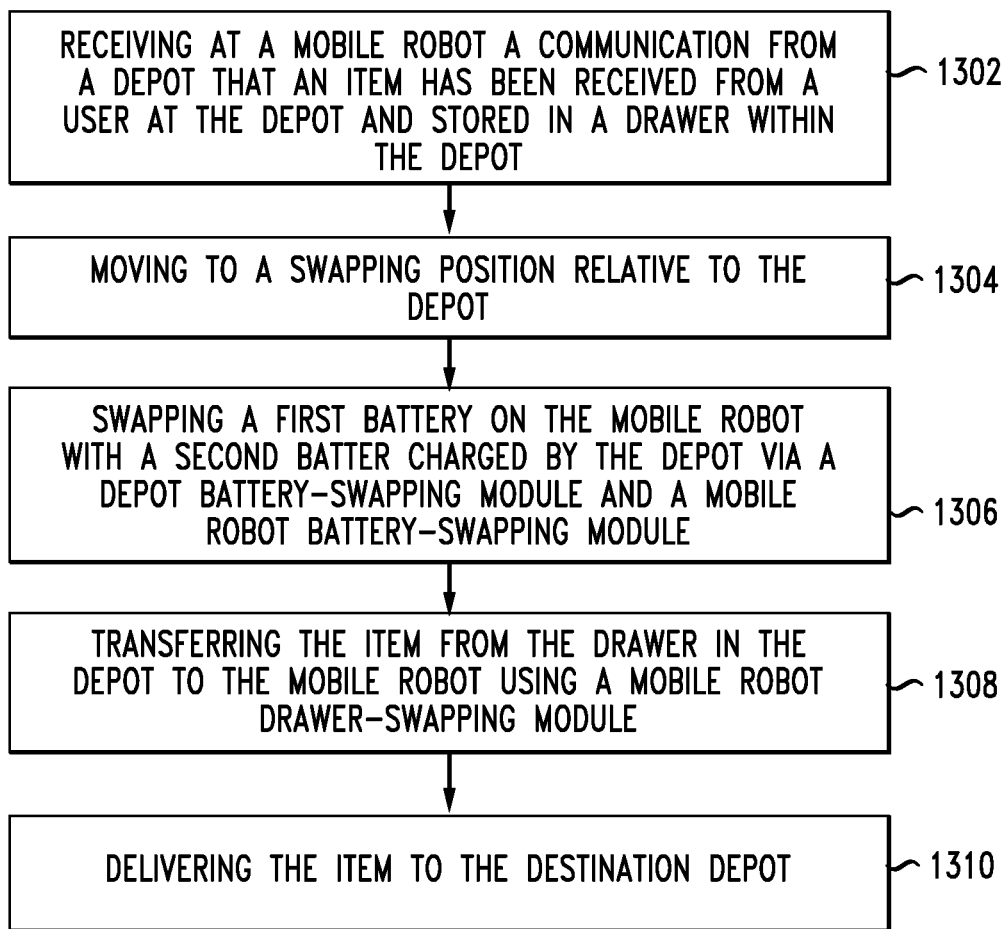
FIG. 13 illustrates a method embodiment from the standpoint of the mobile robot.

FIGS. 11-13 illustrate method embodiments beginning with a method in FIG. 11 which describes the steps that occur for the asynchronous item delivery system which encompasses both the depot 302 and a mobile robot 314, as well as potentially the server 822. The method includes receiving, at a depot and via a depot user interface, a specification by a user of a destination depot and an item to yield item delivery data (1102), receiving, at a depot and via a depot user interface, a specification by a user of a destination depot and an item to yield item delivery data (1104), selecting, based on item delivery data and by a depot control system, a drawer from a rack module in the depot that houses drawers (1106) and receiving the item from the user via the depot user interface (1108). The item can be received into a drawer directly from the user, or can be received into a receiving mechanism which can then transport the item within the depot 302 to a drawer within a rack of drawers.

The method includes communicating the item to the drawer within the rack module that houses drawers (1110), communicating, from the depot and to a mobile robot, a message to pick up the item (1112), swapping a first battery on the mobile robot with a second batter charged by the depot via a depot battery-swapping module and a mobile robot battery-swapping module (1114), transferring the item from the drawer in the depot to the mobile robot using a depot drawer-swapping module and a mobile robot drawer-swapping module (1116) and delivering, by the mobile robot, the item to the destination depot (1118).

FIG. 12 illustrates a method embodiment from the standpoint of the depot 302 in the functionality only occurring or being performed by components of the depot 302. The method includes receiving, at a depot and via a depot user interface, a specification by a user of a destination depot and an item to yield item delivery data (1202), receiving, at a depot and via a depot user interface, a specification by a user of a destination depot and an item to yield item delivery data (1204), selecting, based on item delivery data and by a depot control system, a drawer from a rack module in the depot that houses drawers (1206) and receiving the item from the user via the depot user interface (1208). The item can be received into a drawer directly from the user, or can be received into a receiving mechanism which can then transport the item within the depot 302 to a drawer within a rack of drawers.

The method includes communicating the item to the drawer within the rack module that houses drawers (1210), communicating, from the depot and to a mobile robot, a message to pick up the item (1212), receiving a first battery from the mobile robot (1214), providing a second batter charged by the depot via a depot battery-swapping module and a mobile robot battery-swapping module to the mobile robot (1216), transferring the item from the drawer in the depot to the mobile robot using a depot drawer-swapping module and a mobile robot drawer-swapping module (1218) wherein the item can be delivered by the mobile robot to the destination depot.

The aspect of this disclosure of swapping, a battery can be part of the basic exchange between the depot 302 and the mobile robot 314. The battery swapping step is a valuable feature in that it can enable the asynchronous workflow, but it is an optional feature.

FIG. 13 illustrates an embodiment from the standpoint of the mobile robot 314. The method includes receiving at a mobile robot a communication from a depot that an item has been received from a user at the depot and stored in a drawer within the depot (1302), moving to a swapping position relative to the depot (1304), swapping a first battery on the mobile robot with a second batter charged by the depot via a depot battery-swapping module and a mobile robot battery-swapping module (1306), transferring the item from the drawer in the depot to the mobile robot using a mobile robot drawer-swapping module (1308) and delivering the item to the destination depot (1310). As noted above, one aspect of the process from the standpoint of the mobile robot 314 can also include receiving an item from a user at the mobile robot 314 for delivery and/or delivering the item to a user directly from the mobile robot 314 independent of the use of an origination or a destination depo.

Multi-Site Coordination of Asynchronous Drawer Delivery

Figure 14:
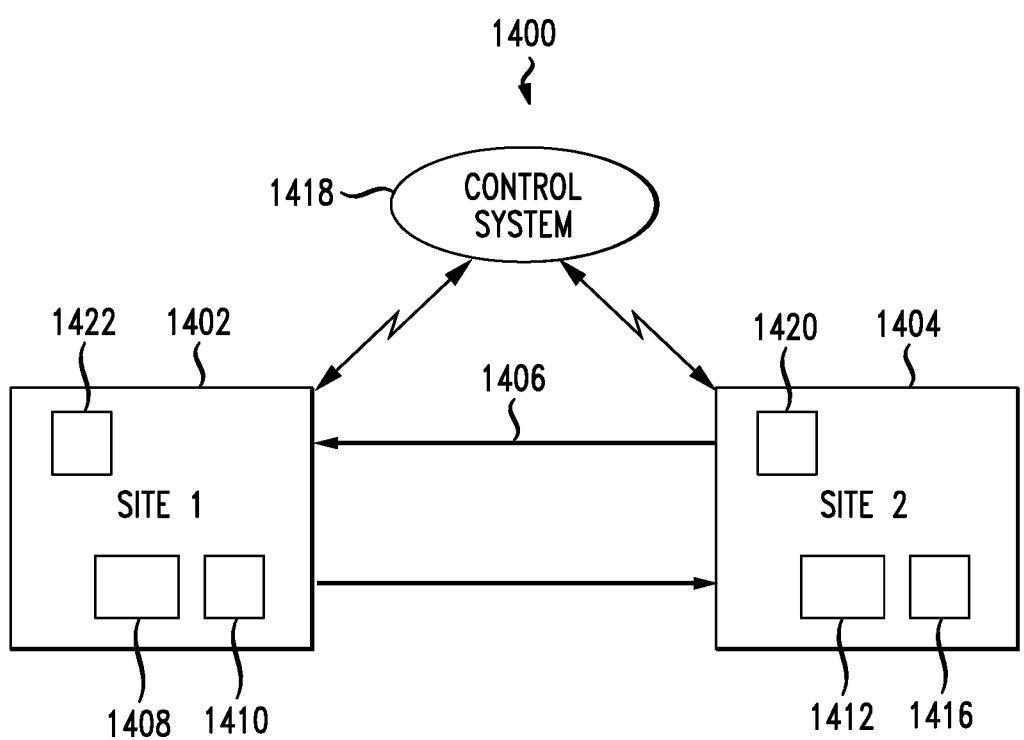
FIG. 14 illustrates a multi-site operation.

FIG. 14 illustrates another aspect or example of this disclosure. In this example, the concept of asynchronous delivery of items using a depot and a mobile robot is expanded to cover a multi-site scenario, each containing at least one depot and at least one mobile robot. For example, in an overall system 1400, a first site 1402 could represent a wholesale distributor or a manufacturer of items. In one example, the items could be medicine or medical supplies. Within site 1, a depot 1408 could be provided in which the interaction of drawers or containers between the depot 1408 and a mobile robot 1410 could operate in an asynchronous manner as disclosed herein. Vehicles, trains, airplanes, or any other mechanism 1406 could be utilized to transfer items between the first site 1402 and a second site 1404. The transportation system could also include a depot and a mobile robot as well. The second site 1404 can include a mobile robot 1412 and an asynchronous delivery depot 1416, which can operate in a manner disclosed herein. In one aspect, a controlled system 1418 can communicate between the first site 1402 and the second site 1404 and with local control units and/or mobile robots and respective depots. In one example, the second site 1404 can represent the last mile destination, such as a hospital, that receives items in containers for ultimate delivery to a patient or a destination location. The concept of asynchronous delivery can be coordinated by the control system 1418 between two physically separate sites 1402 and 1404. In one aspect, there might be more than two separated sites where a manufacturing facility manufactures items for delivery to a wholesale facility which then distributes items to multiple retail facilities or last mile facilities that ultimately utilize the items.

Figure 15:
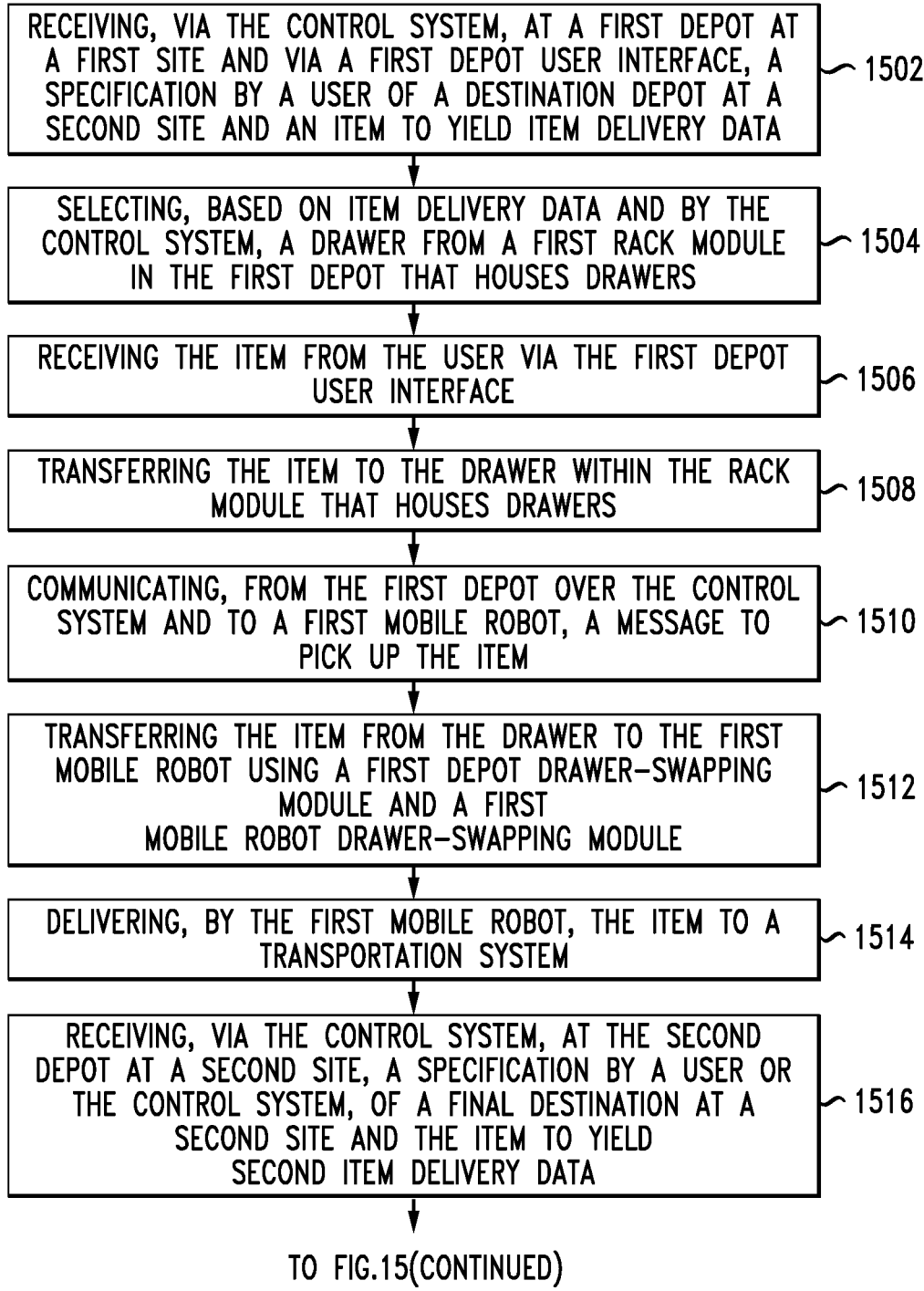
FIG. 15 illustrates a method associated with a multi-site ecosystem.
Figure 15:
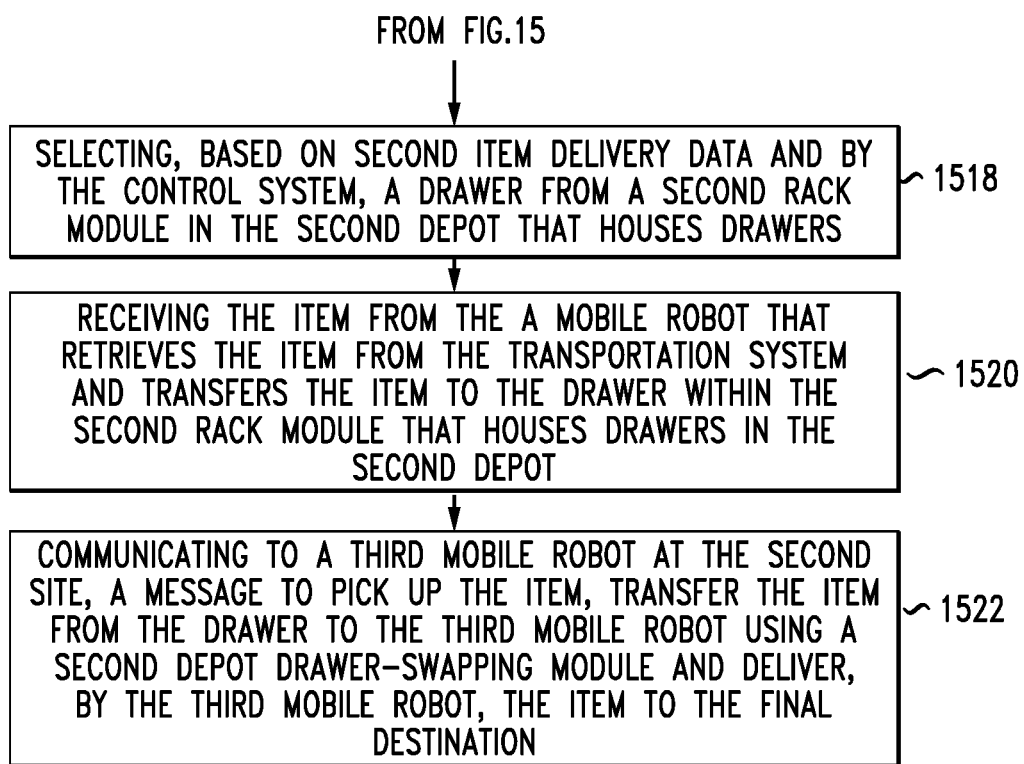

FIG. 15 illustrates a method with respect to expanding an asynchronous concept across multiple sites. A method includes receiving, via the control system, at a first depot at a first site and via a first depot user interface, a specification by a user of a destination depot at a second site and an item to yield item delivery data (1502), selecting, based on item delivery data and by the control system, a drawer from a first rack module in the first depot that houses drawers (1504), receiving the item from the user via the first depot user interface (1506), transferring the item to the drawer within the rack module that houses drawers (1508), communicating, from the first depot over the control system and to a first mobile robot, a message to pick up the item (1510), transferring the item from the drawer to the first mobile robot using a first depot drawer-swapping module and a first mobile robot drawer-swapping module (1512) and delivering, by the first mobile robot, the item to a transportation system (1514). The transportation system could be a trucking system, drone system, train system, plane system, and so forth.

The first mobile robot might deliver the item, which can be contained in a tote, container, drawer, or any other mechanism, into a particular position within the transportation system. For example, a truck may have a trailer with the center aisle in which a mobile robot travels up a ramp and delivers the item at a particular position within a rack of shelves configured within the trailer. The truck would deliver the trailer from the first site to the second site. The control system communicates the position of each item in the rack system on the trailer of the truck such that the second mobile robot at the second site can retrieve each respective container. At the second site, a second depot is configured such that asynchronous delivery of various items to various positions within a rack system of the second depot can occur such that another mobile robot could retrieve items from the second depot for delivery to an ultimate destination.

In this regard, the method includes receiving, via the control system, at the second depot at a second site and via a second depot user interface (optionally), a specification by a user or the control system, a final destination at a second site and the item to yield second item delivery data (1516), selecting, based on item delivery data and by the control system, a drawer from a second rack module in the second depot that houses drawers (1518), receiving the item from the a mobile robot that retrieves the item from the transportation system and transfers the item to the drawer within the second rack module that houses drawers in the second depot (1520). The second depot where the control system can communicate to a third mobile robot at the second site, a message to pick up the item, transfer the item from the drawer to the third mobile robot using a second depot drawer-swapping module and deliver, by the third mobile robot, the item to the final destination (1522). The transportation system could be a trucking system, drone system, train system, plane system, and so forth. The ecosystem or supply chain described herein can include any one or more of the components that are used to move items from one place to another and scan span multiple sites and include components of a transportation system.

The control mechanisms throughout this process can vary in a number of different ways as follows. For example, the control system 1418 can initially only need to know about retrieving items from the first depot 1408 at the first site 1402 for delivery generally to the second depot 1416 at the second site 1404. The control system 1418 may not know the ultimate destination of the item within the second site 1404 or yet another delivery site physically separate from the second site 1404. A separate control system within the second site 1404 can receive data about the delivery of the item to the depot 1416, such that once it receives a confirmation that the item is delivered in a particular drawer of the depot 1416, the local control system can instruct the mobile robot 1412 to retrieve the item from the rack module, and deliver the item to the ultimate room, or individual or destination. A local control system, represented as item 1422 at the first site 1402 and item 1420 at the second site 1404 can communicate with a centralized control system 1418 or can communicate with each other, or can provide any other communication with other vehicles as part of the transportation system, mobile robots, or depots at either location. Such information can include a timing of an expected delivery of an item, a destination room or location of an item that is to be transported from one site to another, a priority associated with an item, a weight or volume of the item, information about patients, doctors or any individual associated with the delivery of an item, power levels associated with mobile robots in the supply chain, social media data, patient data, and so forth. All of this data can be utilized by a centralized control system 1418 to manage the asynchronous delivery of items between the depot 1408 at one site and another depot 1416 at a second site.

In another example, control of the movement of items can occur via a distributed control mechanism in which individual components, as disclosed herein, such as mobile robots or depot stations, vindicate with one another to manage the transfer and movement of items through the supply chain.

As one non-limiting example of how this could occur, a mobile robot 1412 charging information could be provided from a local control system 1422 centralized control system 1418. Such information could indicate that the mobile robot 1412 has six hours of charge left before it has to stop for eight hours and be charged. The control system 1418 can identify items as site 1 that are positioned in the depot 1408 and could also recognize the transportation system 1406 delivery time, and delivery schedule and provided instruction for a mobile robot 1410 to retrieve a drawer from the depot 1408 and deliver it to a trailer as part of the transportation system 1406. The control system 1418 can provide instructions in order for the item to arrive at the depot 1416 at the second site 1404 in time for the mobile robot 1412 to retrieve the item and deliver it to its destination prior to needing a recharge. The control system 1418 can receive any supply chain related data and coordinate multiple different sites that have asynchronous delivery mechanisms for improved efficiency. Knowing the timing requirements for the movement of items between the two sites can improve efficiencies in terms of asynchronous delivery of items to different depots across disparate sites.

Machine learning and artificial intelligence can be incorporated in any aspect of this asynchronous delivery system. The control system 1418 will receive different kinds of data as articulated above, and can coordinate the movement of items through the supply chain and between the first site 1402 and the second site 1404. The control system 1418 can also manage the transportation system with respect to a timing of when delivery should be made such that mobile robots 1410 and 1412 can also coordinate the loading and unloading of the transportation system. Machine learning algorithms can be trained on the various data that would be received by the control system 1418 such that decisions can be made with respect to asynchronous usage of the first depot 1408 and the second depot 1416 at different physical sites within the overall ecosystem. Thus, when orders or data is received with respect to the need for an item to be delivered at a particular location, the machine learning algorithm can provide predictions or an estimation or instructions for how and when to deliver in an asynchronous manner, the item to a first depot 1408 which ultimately is transported via the transportation system 1406 to a second depot 1416 for ultimate delivery via a mobile robot 1412 to the destination location.

One example mechanism is as follows. Assume the doctor at site 1404 requests a certain medicine for patient which should be administered the next day at noon. The doctor could enter that prescription into a user interface that would then enter into a local control system 1420, which could also communicate the same data to a control system 1418. As a result of that order, and other orders coming from other doctors or for other patients, the asynchronous delivery system, utilizing multiple depots, could coordinate the use of the asynchronous depots 1408 and 1416. With the respective other components disclosed in FIG. 14, to enable an efficient delivery of the medicine on time at the destination room at the hospital 1404.

As can be appreciated, the items that would be distributed to the system disclosed in FIG. 14 can be any product or items, and certainly does not have to be limited to a hospital setting. The sites represented in FIG. 14 can also be expanded to three or more sites, each of which can have an asynchronous delivery depot and mobile robots such that the entire supply chain can be managed and coordinated utilizing the asynchronous delivery depot disclosed herein.

In one aspect, an asynchronous item delivery system includes a first depot at a first site, the first depot communicating with a centralized control system. The first depot can include one or more of the following components: a first rack module that houses drawers and a first depot control system that connects to and controls the first rack module. The first site can include a first mobile robot that can include one or more of a first mobile robot drawer-swapping module and a first mobile control system that connects and controls the first mobile robot drawer-swapping module. The first depot and the first mobile robot can operate in a coordinated manner to asynchronously deliver items from the first depot to a first destination at the first site.

The asynchronous item delivery system can also include a second depot at a second site, the second depot communicating with the centralized control system. Similar to the first depot, the second depot can include one or more of a second rack module that houses drawers and a second depot control system that connects to and controls the second rack module. The second site can include a second mobile robot, which can include one or more of a second mobile robot drawer-swapping module and a second mobile control system that connects and controls the second mobile robot drawer-swapping module. The second depot and the second mobile robot can operate in a coordinated manner to asynchronously deliver items from the second depot to a second destination at the second site. With the various components established, at the first site and the second site, the centralized control system can control and manage the movement of items through the entire ecosystem. For example, the control system can receive an identification of an item to be delivered from the first site to the second destination at the second site and coordinate movement of the item from an origination location at the first site to the first depot at the first site, to the first destination at the first site, to a transportation system which delivers the item from the first site to the second site, to the second depot, and to the second destination at the second site. Utilizing this approach, the control system can provide management instructions, which can cause, for example, a mobile robot to pick up an item from a drawer at the first depot configured at the first site based on an understanding of timing associated with the first item being able to be received at a transportation system, transported to the second site, and positioned in an asynchronous manner at the second depot configured at the second site. In other words, the asynchronous positioning of items at the first depot at the first site can be utilized and coordinated with asynchronous positioning of items at the second depot at the second site.

The first depot can further include one or more of a first depot user interface, a first depot drawer-swapping module and a first depot battery-swapping module. The first depot control system can connect to and control two or more of the first depot user interface, the first rack module, the first depot battery-swapping module and the first depot drawer-swapping module.

The second depot can further include one or more of a second depot user interface, a second depot drawer-swapping module and a second depot battery-swapping module. The second depot control system can connect to and control two or more of the second depot user interface, the second rack module, the second depot battery-swapping module and the second depot drawer-swapping module.

Coordinating movement of the item from an origination location to the first depot at the first site to the second destination at the second site can utilize the first depot and the first mobile robot operating in a coordinated manner to asynchronously deliver the item from the first depot to the first destination at the first site.

Furthermore, coordinating the movement of the item from an origination location to the first depot at the first site to the second destination at the second site can utilize the second depot and the second mobile robot operating in a coordinated manner to asynchronously deliver the item from the second depot to the second destination at the second site. In another aspect, coordinating movement of the item from an origination location to the first depot at the first site to the second destination at the second site can utilize a machine learning algorithm that predicts a timing of a movement of the item between the first site, the second site, and the second destination at the second site.

In yet another aspect, coordinating movement of the item from an origination location to the first depot at the first site to the second destination at the second site can utilize at least one or more of the following data associated with the item: information about a recipient of the item, information about a person that ordered the item, information about congestion in the transportation system, information about a priority associated with the item, information about a service level agreement associated with delivering the item, dynamic information about a priority associated with the item while in transit, a payment associated with delivering the item, social media data associated with delivering the item, a timing associated with delivery of the item, a type of transportation used in the transportation system, and predicted congestion at the first site or the second site. Other data can also include traffic patterns, weather patterns, weather predictions, traffic pattern predictions, congestion at the first site or the second site which can impact mobile robot movement through the first site or the second site, and so forth.

Coordinating movement of the item from an origination location to the first depot at the first site to the second destination at the second site can further include the centralized control system controlling one or more of the first depot, the first rack module that houses drawers, the first depot control system, the first mobile robot, the first mobile robot drawer swapping module, the first mobile control system, the second depot, the second rack module, the second depot control system, the second mobile robot, the second mobile robot drawer swapping module, the second mobile control system.

The system can compile a manifest for each drawer in the first rack module and the second rack module. The manifest can include one or more of an identification of a respective drawer, items in the respective drawer, a respective destination, and instructions for delivery of the item.

In another aspect, an example system can include a processor and a computer-readable storage device storing instructions which, when executed by the processor, cause the processor to perform certain operations. These operations can include one or more of receiving, at a first depot at a first site and via a first depot user interface, a specification by a user of a destination location at a second site and an item to yield first item delivery data, selecting, based on first item delivery data and by a centralized control system, a first drawer from a first rack module in the first depot that houses first drawers, receiving the item from the user via the first depot user interface, transferring the item to the first drawer within the first rack module that houses drawers, communicating, to a first mobile robot, a message to pick up the item and transferring the item from the first drawer to the first mobile robot using a first depot drawer-swapping module and a first mobile robot drawer-swapping module, transferring the item from the first mobile robot at the first site, through a transportation system, to the second site.

At the second site, the method further includes receiving, at a second depot at the second site and via a second depot user interface, a specification of the destination location at the second site and an item to yield second item delivery data, selecting, based on second item delivery data and by the system, a second drawer from a second rack module in the second depot that houses second drawers, receiving the item via the second depot user interface, transferring the item to the second drawer within the second rack module that houses drawers, communicating, to a second mobile robot, a message to pick up the item and transferring the item from the second drawer to the second mobile robot using a second depot drawer-swapping module and a second mobile robot drawer-swapping module, wherein the second mobile robot is configured to deliver the item to the destination location.

The computer-readable storage device can store additional instructions which, when executed by the processor, cause the processor to perform operations including compiling a manifest for each drawer in the first rack module in the second rack module that houses the first drawers and the second drawers.

The manifest in this regard can include one or more of an identification of the first drawer or the second drawer, items in the first drawer or the second drawer, the destination location, and instructions for delivery of the item.

The computer-readable storage device can store additional instructions which, when executed by the processor, cause the processor to perform operations including, after receiving the item in the first drawer or the second drawer, routing the first drawer or the second drawer to a chosen position in the first rack module or the second rack module in preparation for retrieval by the first mobile robot or the second mobile robot.

In another aspect, the method can include delivering, by the second mobile robot, the item to the destination location, which can be performed using machine learning to schedule one of a route, a timing and a pace of delivering the item to the destination location.

Figure 16:
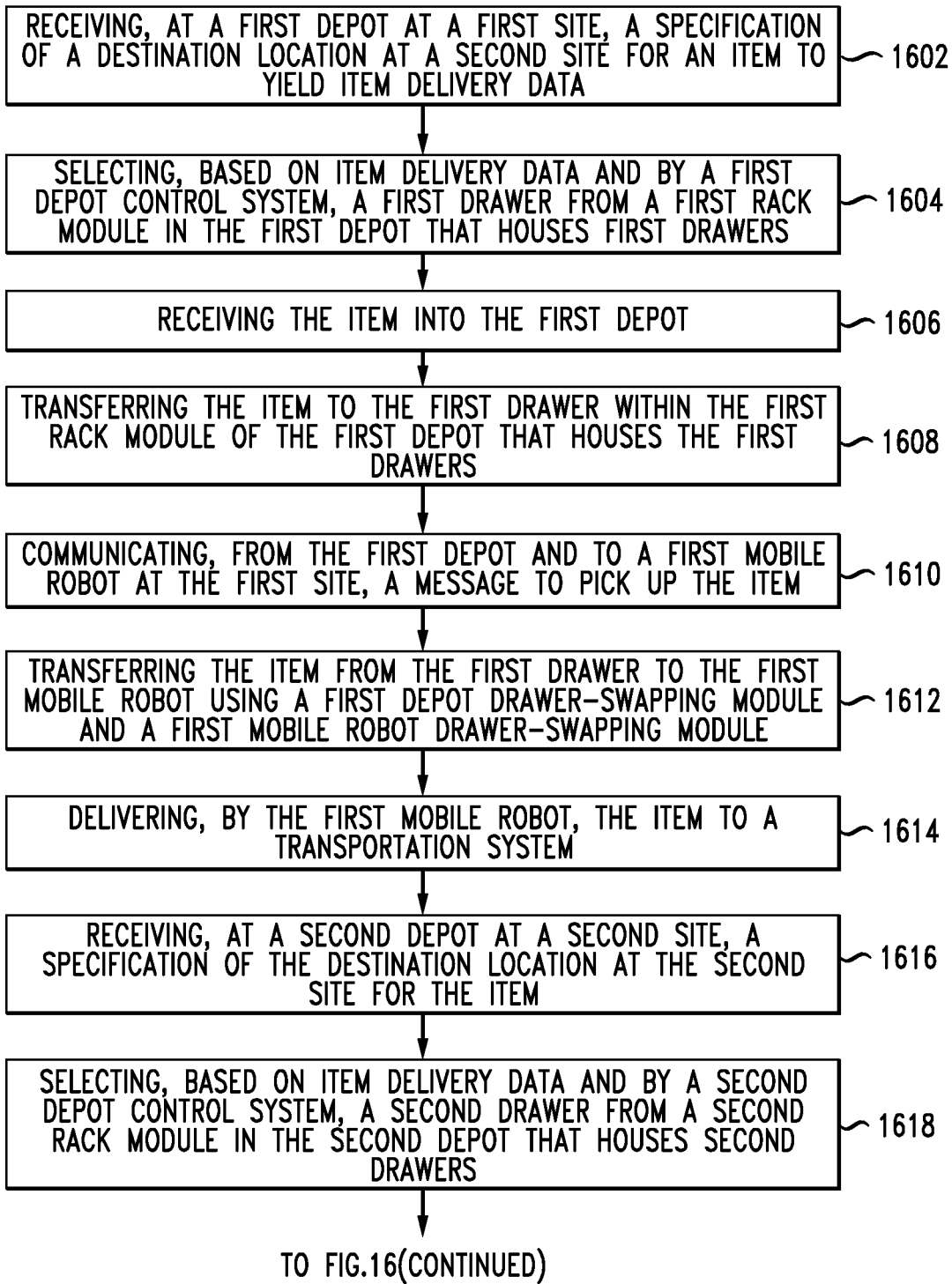
FIG. 16 illustrates another method associated with a multi-site ecosystem.
Figure 16:
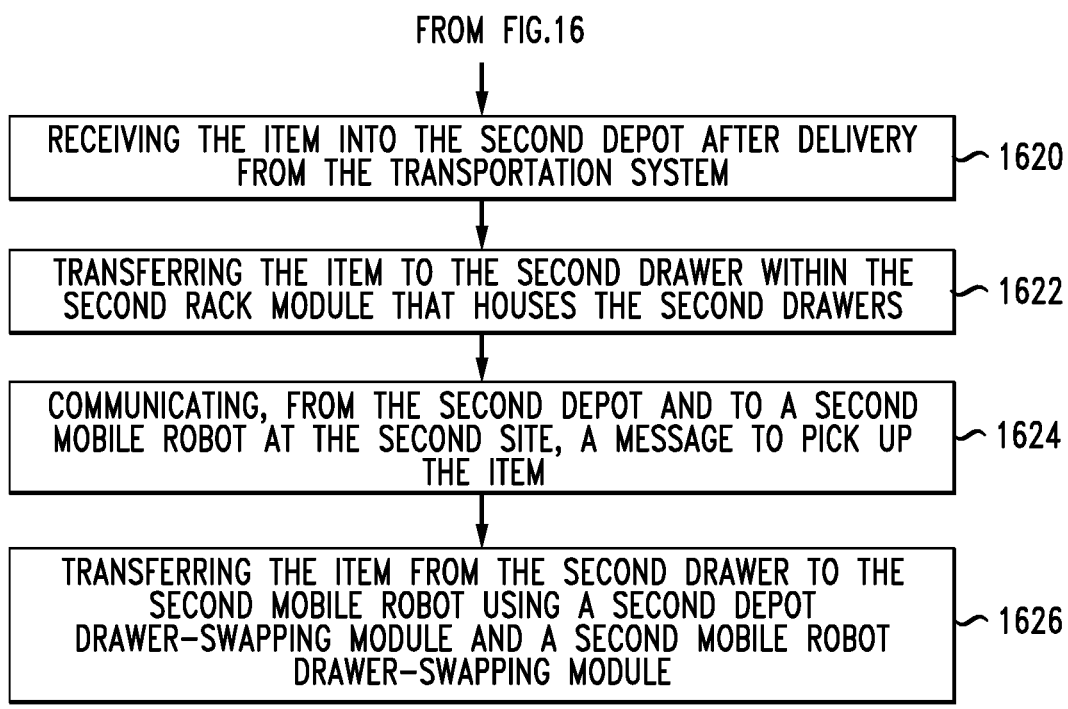

FIG. 16 illustrates a method embodiment associated with multiple site delivery. A method relates to coordinating the transportation of an item from a first site to a second site and through a supply chain. The method includes receiving, at a first depot at a first site, a specification of a destination location at a second site for an item to yield item delivery data (1602), selecting, based on item delivery data and by a first depot control system, a first drawer from a first rack module in the first depot that houses first drawers (1604), receiving the item into the first depot (1606), transferring the item to the first drawer within the first rack module of the first depot that houses the first drawers (1608), communicating, from the first depot and to a first mobile robot at the first site, a message to pick up the item (1610), transferring the item from the first drawer to the first mobile robot using a first depot drawer-swapping module and a first mobile robot drawer-swapping module (1612) and delivering, by the first mobile robot, the item to a transportation system (1614).

The first portion of FIG. 16 outlined above, details the process of using asynchronous use of the first depot at the first site for processing items, at least to a transportation system. Elements of the transportation system can also include asynchronous loading and unloading. In one aspect, one could to consider the transportation system as the second site disclosed herein, which has its own depot and robots that operate in an asynchronous manner.

The method further includes the process occurring at the second site. In this regard, the method includes receiving, at a second depot at a second site, a specification of the destination location at the second site for the item (1616), selecting, based on item delivery data and by a second depot control system, a second drawer from a second rack module in the second depot that houses second drawers (1618), receiving the item into the second depot after delivery from the transportation system (1620), transferring the item to the second drawer within the second rack module that houses the second drawers (1622), communicating, from the second depot and to a second mobile robot at the second site, a message to pick up the item (1624), transferring the item from the second drawer to the second mobile robot using a second depot drawer-swapping module and a second mobile robot drawer-swapping module (1626) and delivering, by the second mobile robot, the item to the destination location at the second site, wherein the first depot and the second depot utilize an asynchronous approach to managing items and the coordination with the first mobile robot and the second mobile robot (1628). This process also outlines the movement of the item through the second site to a final destination utilizing asynchronous series of steps. As noted above, a control system can manage the overall receipt, storage, delivery, and so forth, with respect to the movement of the item through the supply chain. The control system can manage the asynchronous use of the first depot and the second depot at the first site and the second site, respectively.

The first depot and the second depot can scan the item before receiving the item in the first drawer or the second drawer. In another aspect, the method can further include compiling a manifest for each drawer in the first rack module and the second rack module. In one example, the manifest can include one or more of an identification of a drawer, items in the drawer, the destination location, and instructions for delivery of the item. The manifest can also include other data regarding the multi-site transition of the item including data about the transportation system. Example, the manifest might include data about a refrigeration unit utilized in the transportation system to transfer the item, and whether the appropriate temperatures were met throughout the trip.

The method can further include determining, by the first mobile robot or the second robot, that a charge level of a first battery installed in the first mobile robot or the second mobile robot is less than a threshold and swapping the first battery with a second charged battery in one of the first depot or the second depot. This battery swapping approach can apply to any site or any component of the transportation system for any mobile robot that is operating within this ecosystem or supply chain. After receiving the item in the first drawer or the second drawer, the method can include routing the first drawer or the second drawer to a chosen position in the first rack module or the second rack module in preparation for retrieval by the first mobile robot for the second mobile robot. The step of delivering, by the second mobile robot, the item to the destination location can be performed using machine learning to schedule one of a route, a timing and a pace of delivering the item to the destination location.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. An asynchronous item delivery system comprising:
 a first depot at a first site, the first depot communicating with a centralized control system, the first depot comprising:
  a first rack module that houses drawers; and
  a first depot control system that connects to and controls the first rack module;
 a first mobile robot comprising:
  a first mobile robot drawer-swapping module; and
  a first mobile control system that connects and controls the first mobile robot drawer-swapping module, wherein the first depot and the first mobile robot operate in a coordinated manner to asynchronously deliver items from the first depot to a first destination at the first site;
 a second depot at a second site, the second depot communicating with the centralized control system, the second depot comprising:
  a second rack module that houses drawers; and
  a second depot control system that connects to and controls the second rack module; and
 a second mobile robot comprising:
  a second mobile robot drawer-swapping module; and
  a second mobile control system that connects and controls the second mobile robot drawer-swapping module, wherein the second depot and the second mobile robot operate in a coordinated manner to asynchronously deliver items from the second depot to a second destination at the second site, wherein the centralized control system performs operations comprising:
   receiving an identification of an item to be delivered from the first site to the second destination at the second site;
   coordinating movement of the item from an origination location at the first site to the first depot at the first site, to the first destination at the first site, to a transportation system which delivers the item from the first site to the second site, to the second depot, and to the second destination at the second site.

2. The asynchronous item delivery system of claim 1, wherein the first depot further comprises one or more of:
 a first depot user interface;
 a first depot drawer-swapping module; and
 a first depot battery-swapping module, wherein the first depot control system connects to and controls two or more of the first depot user interface, the first rack module, the first depot battery-swapping module and the first depot drawer-swapping module.

3. The asynchronous item delivery system of claim 2, wherein the second depot further comprises one or more of:
 a second depot user interface;
 a second depot drawer-swapping module; and
 a second depot battery-swapping module, wherein the second depot control system connects to and controls two or more of the second depot user interface, the second rack module, the second depot battery-swapping module and the second depot drawer-swapping module.

4. The asynchronous item delivery system of claim 1, wherein coordinating movement of the item from an origination location to the first depot at the first site to the second destination at the second site utilizes the first depot and the first mobile robot operating in a coordinated manner to asynchronously deliver the item from the first depot to the first destination at the first site.

5. The asynchronous item delivery system of claim 4, wherein coordinating movement of the item from an origination location to the first depot at the first site to the second destination at the second site utilizes the second depot and the second mobile robot operating in a coordinated manner to asynchronously deliver the item from the second depot to the second destination at the second site.

6. The asynchronous item delivery system of claim 1, wherein coordinating movement of the item from an origination location to the first depot at the first site to the second destination at the second site utilizes a machine learning algorithm that predicts a timing of a movement of the item between the first site, the second site, and the second destination at the second site.

7. The asynchronous item delivery system of claim 1, wherein coordinating movement of the item from an origination location to the first depot at the first site to the second destination at the second site utilizes at least one or more of the following data associated with the item: information about a recipient of the item, information about a person that ordered the item, information about congestion in the transportation system, information about a priority associated with the item, information about a service level agreement associated with delivering the item, dynamic information about a priority associated with the item while in transit, a payment associated with delivering the item, social media data associated with delivering the item, a timing associated with delivery of the item, a type of transportation used in the transportation system, and predicted congestion at the first site or the second site.

8. The asynchronous item delivery system of claim 1, wherein coordinating movement of the item from an origination location to the first depot at the first site to the second destination at the second site further comprises the centralized control system controlling one or more of the first depot, the first rack module that houses drawers, the first depot control system, the first mobile robot, the first mobile robot drawer swapping module, the first mobile control system, the second depot, the second rack module, the second depot control system, the second mobile robot, the second mobile robot drawer swapping module, the second mobile control system.

9. The asynchronous item delivery system of claim 1, further comprising compiling a manifest for each drawer in the first rack module and the second rack module.

10. The asynchronous item delivery system of claim 9, wherein the manifest comprises one or more of an identification of a respective drawer, items in the respective drawer, a respective destination, and instructions for delivery of the item.

11. A method a coordinating transportation of an item from a first site to a second site, the method comprising:
receiving, at a first depot at a first site, a specification of a destination location at a second site for an item to yield item delivery data;
selecting, based on item delivery data and by a first depot control system, a first drawer from a first rack module in the first depot that houses first drawers;
receiving the item into the first depot;
transferring the item to the first drawer within the first rack module of the first depot that houses the first drawers;
communicating, from the first depot and to a first mobile robot at the first site, a message to pick up the item;
transferring the item from the first drawer to the first mobile robot using a first depot drawer-swapping module and a first mobile robot drawer-swapping module;
delivering, by the first mobile robot, the item to a transportation system;
receiving, at a second depot at a second site, a specification of the destination location at the second site for the item;
selecting, based on item delivery data and by a second depot control system, a second drawer from a second rack module in the second depot that houses second drawers;
receiving the item into the second depot after delivery from the transportation system;
transferring the item to the second drawer within the second rack module that houses the second drawers;
communicating, from the second depot and to a second mobile robot at the second site, a message to pick up the item;
transferring the item from the second drawer to the second mobile robot using a second depot drawer-swapping module and a second mobile robot drawer-swapping module; and
delivering, by the second mobile robot, the item to the destination location at the second site, wherein the first depot and the second depot utilize an asynchronous approach to managing items and the coordination with the first mobile robot and the second mobile robot.

12. The method of claim 11, wherein the first depot and the second depot scan the item before receiving the item in the first drawer or the second drawer.

13. The method of claim 12, further comprising compiling a manifest for each drawer in the first rack module and the second rack module, the manifest comprising one or more of an identification of a drawer, items in the drawer, the destination location, and instructions for delivery of the item.

14. The method of claim 11, further comprising:
determining, by the first mobile robot or the second robot, that a charge level of a first battery installed in the first mobile robot or the second mobile robot is less than a threshold; and
swapping the first battery with a second charged battery in one of the first depot or the second depot.

15. The method of claim 11, wherein after receiving the item in the first drawer or the second drawer, routing the first drawer or the second drawer to a chosen position in the first rack module where the second rack module in preparation for retrieval by the first mobile robot or the second mobile robot.

16. The method of claim 11, wherein delivering, by the second mobile robot, the item to the destination location is performed using machine learning to schedule one of a route, a timing and a pace of delivering the item to the destination location.

17. A system comprising:
a processor; and
a computer-readable storage device storing instructions which, when executed by the processor, cause the processor to perform operations comprising:
receiving, at a first depot at a first site and via a first depot user interface, a specification by a user of a destination location at a second site and an item to yield first item delivery data;

selecting, based on first item delivery data and by a centralized control system, a first drawer from a first rack module in the first depot that houses first drawers;

receiving the item from the user via the first depot user interface;

transferring the item to the first drawer within the first rack module that houses drawers;

communicating, to a first mobile robot, a message to pick up the item; and transferring the item from the first drawer to the first mobile robot using a first depot drawer-swapping module and a first mobile robot drawer-swapping module;

transferring the item from the first mobile robot at the first site, through a transportation system, to the second site;

receiving, at a second depot at the second site and via a second depot user interface, a specification of the destination location at the second site and an item to yield second item delivery data;

selecting, based on second item delivery data and by the system, a second drawer from a second rack module in the second depot that houses second drawers;

receiving the item via the second depot user interface;

transferring the item to the second drawer within the second rack module that houses drawers;

communicating, to a second mobile robot, a message to pick up the item; and transferring the item from the second drawer to the second mobile robot using a second depot drawer-swapping module and a second mobile robot drawer-swapping module, wherein the second mobile robot is configured to deliver the item to the destination location.

18. The system of claim 17, wherein the computer-readable storage device stores additional instructions which, when executed by the processor, cause the processor to perform operations comprising: compiling a manifest for each drawer in the first rack module in the second rack module that houses the first drawers and the second drawers.

19. The system of claim 18, wherein the manifest comprises one or more of an identification of the first drawer or the second drawer, items in the first drawer or the second drawer, the destination location, and instructions for delivery of the item.

20. The system of claim 17, wherein the computer-readable storage device stores additional instructions which, when executed by the processor, cause the processor to perform operations comprising: after receiving the item in the first drawer or the second drawer, routing the first drawer or the second drawer to a chosen position in the first rack module or the second rack module in preparation for retrieval by the first mobile robot or the second mobile robot.

21. The system of claim 17, wherein delivering, by the second mobile robot, the item to the destination location is performed using machine learning to schedule one of a route, a timing and a pace of delivering the item to the destination location.

* * * * *